US006527494B2

(12) United States Patent  
Hurlburt

(10) Patent No.: US 6,527,494 B2
(45) Date of Patent: Mar. 4, 2003

(54) TRAILER HAVING TILT AND DUMP FUNCTIONS

(75) Inventor: Joseph C. Hurlburt, Lancaster, PA (US)

(73) Assignee: Innovations By Contract, Inc, Lancaster, PA (US)

( * ) Notice: Subject to any disclaimer, the term of this patent is extended or adjusted under 35 U.S.C. 154(b) by 0 days.

(21) Appl. No.: 10/055,215

(22) Filed: Jan. 23, 2002

(65) Prior Publication Data

US 2002/0110442 A1 Aug. 15, 2002

Related U.S. Application Data

(60) Provisional application No. 60/268,448, filed on Feb. 13, 2001.

(51) Int. Cl.[7] .............................. B60P 1/28; B60P 1/30; B60P 1/16
(52) U.S. Cl. ...................... 414/482; 414/483; 414/484; 414/485; 298/17.5; 298/22 R
(58) Field of Search ................. 414/482, 483, 414/484, 485; 298/5, 11, 17.5, 22 R

(56) References Cited

U.S. PATENT DOCUMENTS 2,718,431 A * 9/1955 Pietroroia ..................... 298/22
3,058,779 A * 10/1962 Pietroroia ............. 298/17.5 X
5,411,284 A * 5/1995 Harbin ........................ 280/656
5,678,978 A * 10/1997 Markham ............... 414/482 X

FOREIGN PATENT DOCUMENTS

| EP | 199652 | * 10/1986 | ................. 414/485 |
| FR | 1276868 | * 10/1961 | ................. 414/482 |
| GB | 541205 | * 11/1941 | ................. 414/482 |
| WO | 8300033 | * 1/1983 | ................. 414/483 |

* cited by examiner

Primary Examiner—Steven A. Bratlie
(74) Attorney, Agent, or Firm—Miller Law Group, PLLC

(57) ABSTRACT

A frame configuration that is particularly adaptable for use on a trailer such that the frame configuration is operable in both a tilt mode of operation and a dump mode of operation. An actuating mechanism includes a linear actuator that is supported on the frame by a bracket and a yoke that connects to a load bed to power the vertical movement of the load bed in both tilt and dump functions. The linear actuator is pivotally mounted to permit a re-positioning of the actuator into an inoperative position. The frame configuration is provided with an articulated tilt frame in which the tongue is pivoted thereto allowing the load bed to pivot about a tilt axis which can coincide with the wheel axis of the trailer. The bed frame can be locked to the tilt frame for tilting upon articulation with the tongue, while a disconnection of the bed frame from the tilt frame enables the bed frame to pivot about the dump axis to provide a dump function in addition to the tilt function. The actuator can pivot about the connection thereof to the bed frame to position the actuator into a lowered inoperative transport position generally parallel to the trailer tongue. A modified screw jack can be part of a kit that can be utilized to provide the powered operations of the tilt function for existing gravity-based tilt trailers.

42 Claims, 17 Drawing Sheets

TRAILER HAVING TILT AND DUMP FUNCTIONS

CROSS-REFERENCE TO RELATED APPLICATIONS

This application claims domestic priority on U.S. Provisional Patent Application Serial No. 60/268,448, filed Feb. 13, 2001, the contents of which are incorporated herein by reference.

BACKGROUND OF THE INVENTION

This invention relates generally to a trailer attachable to a vehicle and, more particularly, to a trailer configured to provide selectively an operation of tilting about its tire axis and an operation of dumping about a dump axis positioned rearwardly of the tire axis.

Trailers have been designed to provide the ability to tilt or to provide the ability to dump. A trailer that tilts generally has an articulated tongue that, when released to articulate about a generally transversely extending horizontal axis, allows the trailer to pivot about an axis corresponding to the center of the trailer tires, which if mounted coaxially on the trailer axle would correspond to the trailer axle, thus allowing the rearward end of the trailer to lower to the surface of the ground and permit convenient access to the trailer bed. Tilting is typically used to load other wheeled devices onto the trailer bed. Since the rearward end of the trailer bed is positionable adjacent the surface of the ground, a wheeled device such as a wheeled utility vehicle, a motorcycle, or a wheeled hand cart, can easily roll onto the trailer bed. Movement of the tilt function of such trailers is typically accomplished manually by releasing a locking device fixing the bed frame to the trailer tongue to permit the tongue to pivot relative to the bed frame and allow the bed frame to pivot about the tire center. Returning the trailer bed to a transport position with the bed frame fixed to the trailer tongue is typically a matter of balancing the load on the trailer bed relative to the tires to permit the bed frame to be pivoted back into position to be locked to the trailer tongue.

A dump trailer is also known in the art. Dump trailers are configured to pivot the trailer bed about a dump axis carried by the dump frame with the dump axis being located near or at the rearward end of the trailer bed. When the trailer bed is moved into a dump position, the rearward end of the trailer remains elevated above the ground while the forward end of the trailer bed is raised to urge any load on the trailer bed to slide off the bed onto the ground. The dump function is usually not accomplished manually. The movement of the bed frame carrying the trailer bed relative to the dump frame is typically accomplished through a dump actuator that is sufficiently powerful to raise the trailer bed and load thereon. This dump actuator is normally positioned underneath the trailer and is effective to cause a vertical movement of the trailer bed about the rearwardly positioned dump axis. To provide this known dump actuator configuration for a small towed trailer would require that the actuator be remotely powered and that the trailer structure provide sufficient depth to house and protect the dump actuator.

It would be desirable to provide a trailer capable of being towed behind a conventional vehicle, such as a truck or a car, that would be operable to provide both a tilt function and a dump function. It would also be desirable to provide a compact actuator mounting that would be effective to provide the dump function in a manner that would overcome the disadvantages of known dump actuators. It would also be desirable to provide a trailer and actuator configuration that would be conducive to being manually operated without requiring a remote power source.

SUMMARY OF THE INVENTION

It is an object of this invention to overcome the disadvantages of the prior art by providing a trailer having both dump and tilt functions.

It is another object of this invention to provide a trailer having an actuator operable to effect a tilting and dumping operations for the trailer.

It is a feature of this invention that the trailer is provided with a frame configuration that is connected to the tongue of the trailer and supports a bed frame to provide a dump frame configuration.

It is another feature of this invention that the trailer bed is selectively pivotable about a transverse axis corresponding to the axis of rotation of the wheels to provide a tilt feature for the trailer and about a transverse axis located at the rear portion of the trailer to provide a dump feature for the trailer.

It is an advantage of this invention that the same actuator can provide both tilt and dump functions for the trailer.

It is still another feature of this invention that the selection between the tilt and dump operations of the trailer can be selected by disconnecting or unlatching the articulated tilt frame from the tongue or by disconnecting or unlatching the bed frame from the articulated tilt frame.

It is still another object of this invention to provide a mounting for the actuator that will enable the actuator to perform both tilt and dump operations for the same trailer while being capable of being stowed into an inoperative transport position.

It is still another feature of this invention that the actuator can be pivoted about the connections thereof with the bed frame and the tongue of the trailer to be lowered into an inoperative transport position substantially parallel with the tongue of the trailer.

It is still another advantage of this invention that the actuator can be pivoted to a position that lies entirely below the plane of the surface of the trailer bed.

It is yet another object of this invention to provide an actuator that can be manually powered or may be driven by a remote power source.

It is yet another object of this invention to provide an actuator that can be installed as a kit for existing dump or tilt trailers to provide a power apparatus for accomplishing the pivotal movement of the trailer.

It is still another advantage of this invention that the actuator can be selectively configured for operation in a power mode or in a free mode in which the actuator does not interfere with the gravity operation of the trailer to tilt.

It is yet another feature of this invention that a latch mechanism is provided to control the pivotal movement of the actuator between a raised operative position and a lowered inoperative transport position.

It is yet another object of this invention to provide a trailer operable to provide both tilt and dump functions which is durable in construction, inexpensive of manufacture, carefree of maintenance, facile in assemblage, and simple and effective in use.

It is a further object of this invention to provide an actuator that can provide powered tilt and dump operations for a trailer and be convertible between a raised operative position and a lowered inoperative transport position generally parallel to the trailer tongue.

These and other objects, features and advantages are accomplished according to the instant invention by providing a frame configuration that is particularly adaptable for use on a trailer such that the frame configuration is operable in both a tilt mode of operation and a dump mode of operation. An actuating mechanism includes a linear actuator that is supported on the frame by a bracket and a yoke that connects to a load bed to power the vertical movement of the load bed in both tilt and dump functions. The linear actuator is pivotally mounted to permit a re-positioning of the actuator into an inoperative position. The frame configuration is provided with an articulated tilt frame in which the tongue is pivoted thereto allowing the load bed to pivot about a tilt axis which can coincide with the wheel axis of the trailer. The bed frame can be locked to the tilt frame for tilting upon articulation with the tongue, while a disconnection of the bed frame from the tilt frame enables the bed frame to pivot about the dump axis to provide a dump function in addition to the tilt function. The actuator can pivot about the connection thereof to the bed frame to position the actuator into a lowered inoperative transport position generally parallel to the trailer tongue. A modified screw jack can be part of a kit that can be utilized to provide the powered operations of the tilt function for existing gravity-based tilt trailers.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
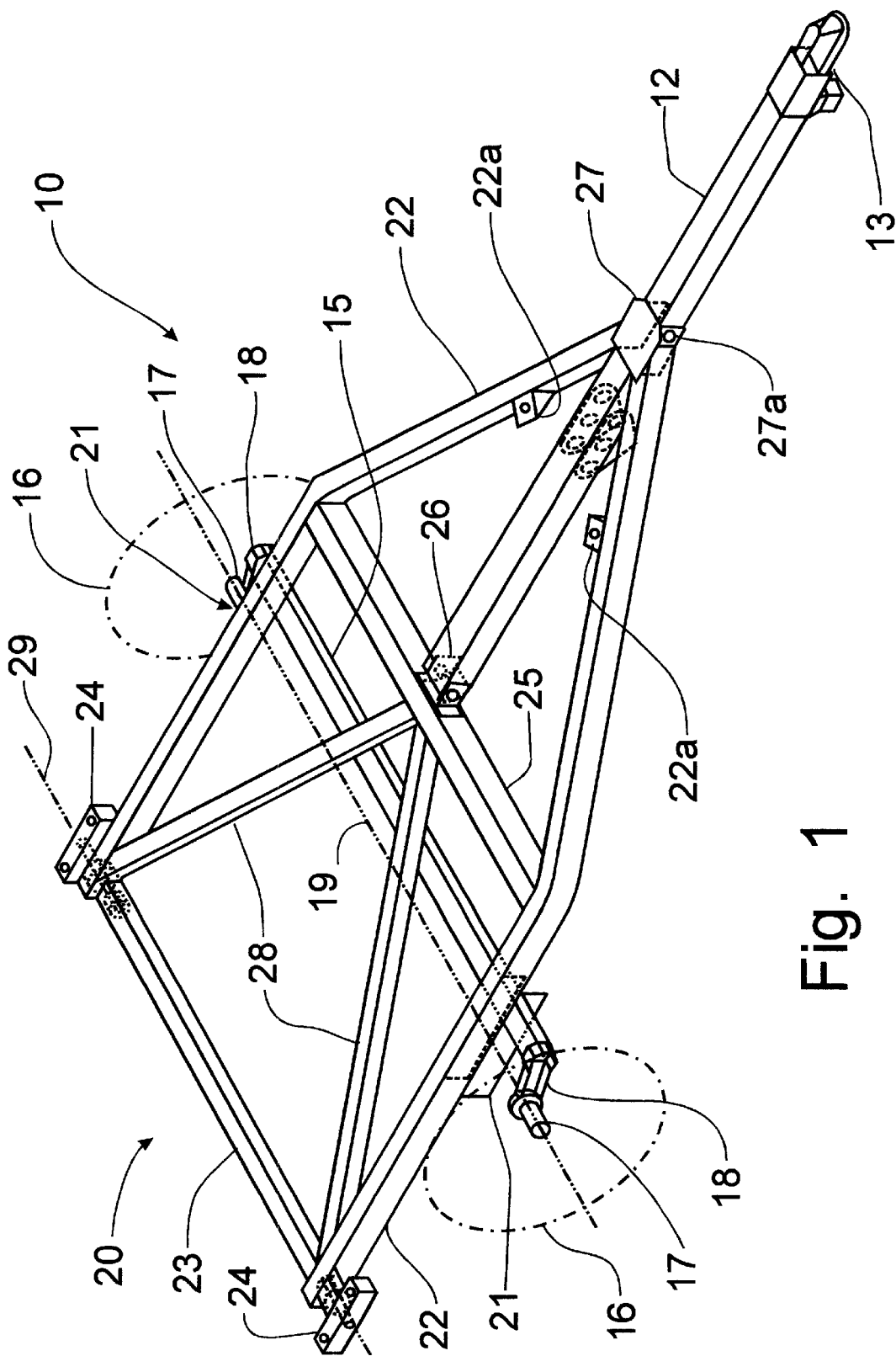
FIG. 1 is a schematic right front perspective view of the articulated tilt frame and tongue of a trailer incorporating the principles of the instant invention.

Referring now to FIGS. 1–6 the details of a trailer frame incorporating the principles of the instant invention can best be seen. Any references to left and right are used as a matter of convenience and are determined by standing at the rear of the trailer and facing the hitch to be connected to a vehicle, which would be the normal direction of travel of the trailer. The trailer 10 has a tongue 12 provided with a hitch 13 located at the forward terminus of the tongue 12 to connect in a known manner to a vehicle, such as a truck or a car to provide motive power for the movement of the trailer 10 over the surface of the ground G. The forward end of the tongue 12 can also be provided with a conventional support jack (not shown) to keep the hitch 13 at a convenient height when disconnected from any vehicle. The trailer 10 also includes an axle 15 on which tires 16 can be directly mounted on or, as is depicted in the drawings, to which tires 16 can be mounted through a pair of laterally opposed suspension arms 18. The tires 16 are rotatable about the spindles 17 allowing the trailer 10 to be movable over the ground G in a conventional manner. The transversely extending spindles 17 also defines a tilt axis 19, as will be described in greater detail below.

The tilt frame 20 can best be seen in FIG. 1. The tilt frame 20 is preferably formed in an "A-frame" configuration and is rigidly connected to the axle 15 by mounting flanges 21. A rear transverse support member 23 defines a dump axis 29, to be described in greater detail below, and carries support brackets 24 pivotable about the dump axis 29 for attachment of the trailer bed frame 30. A front transverse member 25 carries a pivot bracket 26 for pivotally connecting the tongue 12 for articulation about a horizontal articulation axis defined by the pivot bracket 26. The side rails 22 of the tilt frame 20 converge to meet at a lock bracket 27 that is positioned in register with the tongue 12 so that a removable fastener 27a (best seen in FIGS. 1, 3, 5, 6, 11 and 12) can fix the apex of the tilt frame 20 to the tongue 12 and prevent any articulation of the tongue 12 relative to the tilt frame 20 about the pivot bracket 26. Diagonally oriented support struts 28, interconnecting the laterally spaced ends of side rails 22 and the center of the front transverse member 25, provide rigidity for the tilt frame 20. The converging side rails 22 each have a locking tab 22a welded on the inside. The locking tabs 22a are alignable with the mounting members 36 on the trailer bed frame 30, for reasons to be described in greater detail below.

Figure 2:
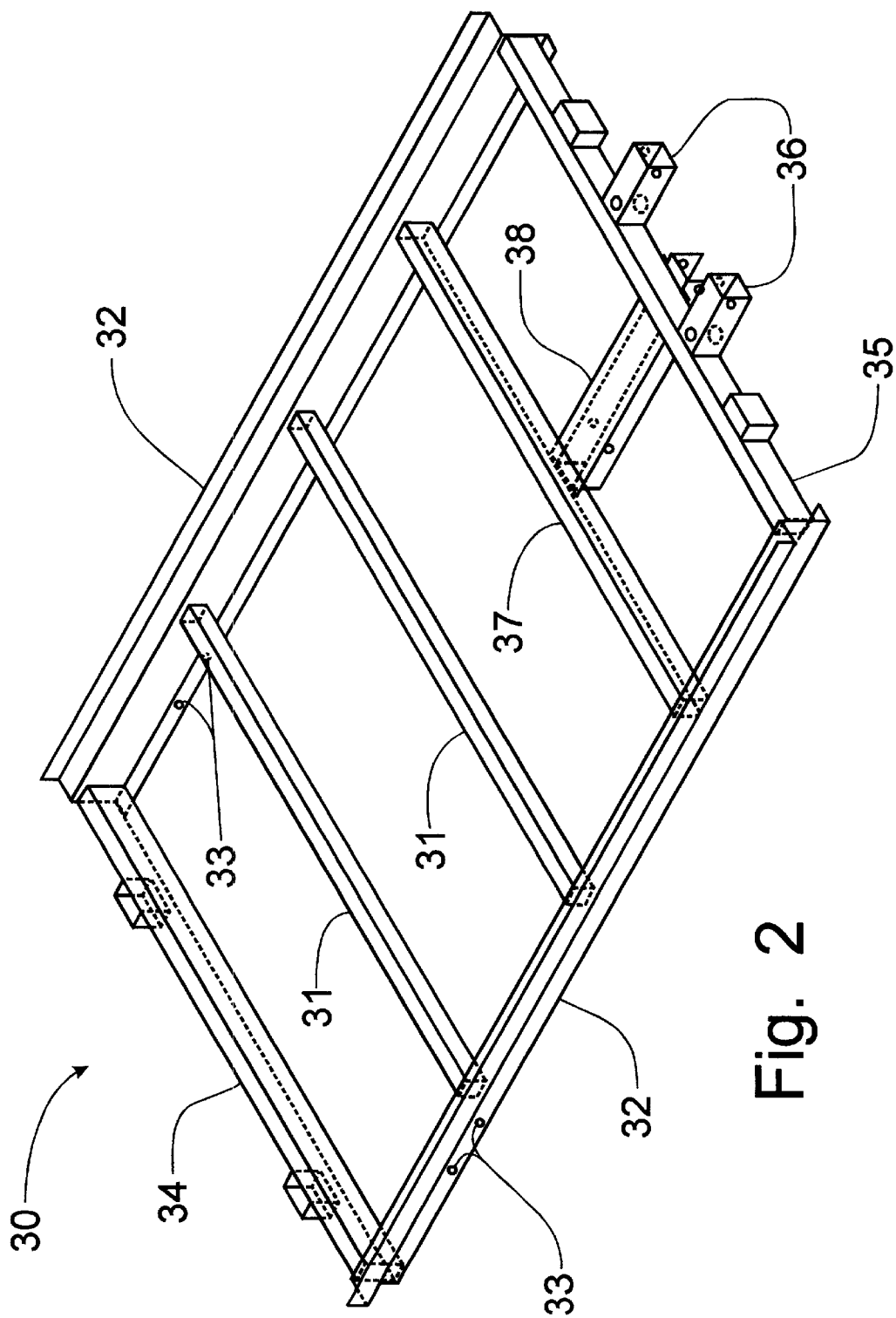
FIG. 2 is a schematic right front perspective view of a trailer bed frame to be mounted on the articulated tilt frame and tongue of the trailer depicted in FIG. 1.

The trailer bed frame 30 can be seen best in FIG. 2 depicted as an independent structure. The trailer bed frame 30 has a pair of laterally spaced side rails 32 that are positionable above the side rails 22 of the tilt frame 20. The side rails 32 of the bed frame 30 are formed with holes 33 for detachable connection by fasteners (not shown) to the support brackets 24. As a result, the trailer bed frame 30 is pivotable about the dump axis 29. The rearwardmost transverse frame member 34 is, therefore, positioned rearwardly of the rearward transverse frame member 23 of the tilt frame 20. Accordingly, any pivotal movement of the trailer bed frame 30 about the dump axis 29 will result in the rearwardmost transverse frame member 34 of the trailer bed frame 30 dropping closer to the ground, while the rearward transverse frame member 23 of the tilt frame 20 maintains its normal elevation above the ground.

The trailer bed frame 30 further includes a forwardmost transverse frame member 35 provided with forwardly projecting mounting members 36 for connecting to the bottle jack 40, as will be described in greater detail below. The mounting members 36 are positioned for alignment with the locking tabs 22a to permit the trailer bed frame 30 to be selectively locked to the tilt frame 20. A tongue bracket 38 is fixed to the forwardmost transverse frame member 35 and to the second transverse frame member 37 and is positioned to surround the tongue 12 when the trailer bed frame 30 is positioned on top of the tilt frame 20 in its normal operating configuration. Central traverse frame members 31 are positioned between the second traverse frame member 37 and the rearmost traverse frame member 34 so that the trailer bed frame 30 will support planking or the like (not shown) to provide a trailer bed in a manner known in the art.

Figure 3:
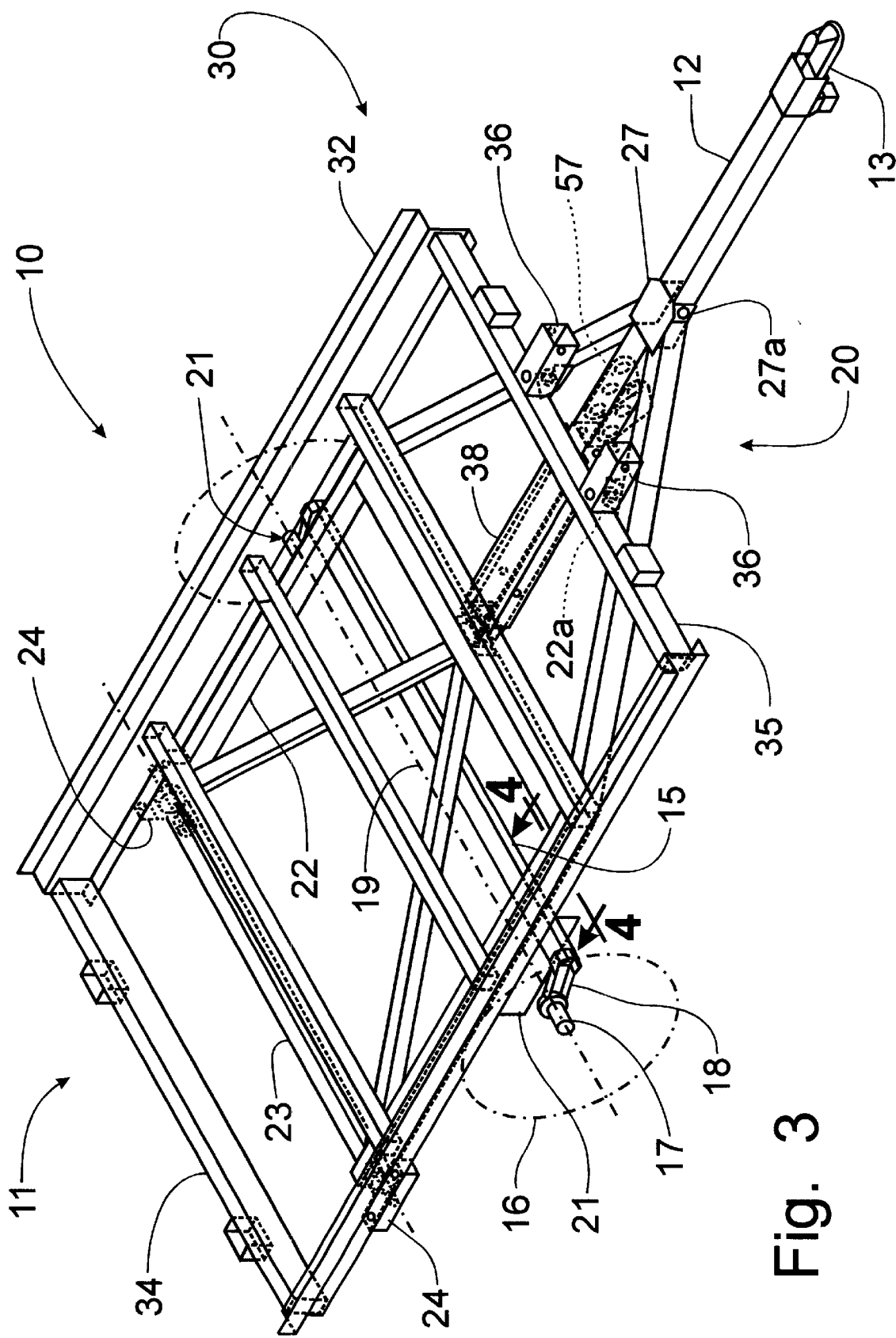
FIG. 3 is a schematic right front perspective view of a trailer frame assembly incorporating the principles of the instant invention to provide both a tilt function and a dump function for the trailer.

Referring now to FIG. 3, the trailer frame 11 can best be seen. The trailer bed frame 30 is mounted on top of the tilt frame 20 with the side rails 32 connected to the support brackets 24 for pivotal movement about the dump axis 29. Removable pins (not shown) interengage the locking tabs 22a and the mounting members 36 to keep the trailer bed frame 30 locked to the tilt frame 20. Alternatively, the locking tabs 22a can be formed with upwardly extending locking pins (not shown) that align with holes through the mounting members 36 which can then be locked into place by click pins, cotter pins, hair pins or the like. The bottle jack mounting brackets 57 are also shown in FIG. 3 connected to the tongue 12 forwardly of the tongue bracket 38 and rearwardly of the lock bracket 27. The details of the bottle jack mounting brackets 57 are better seen in FIGS. 9–12 and are described below. The configuration shown in FIG. 3 is the normal operating position in which the trailer 10 can be towed along the public highway carrying a load without the capability of either tilting or dumping unless reconfigured as described in greater detail below.

Figure 4:
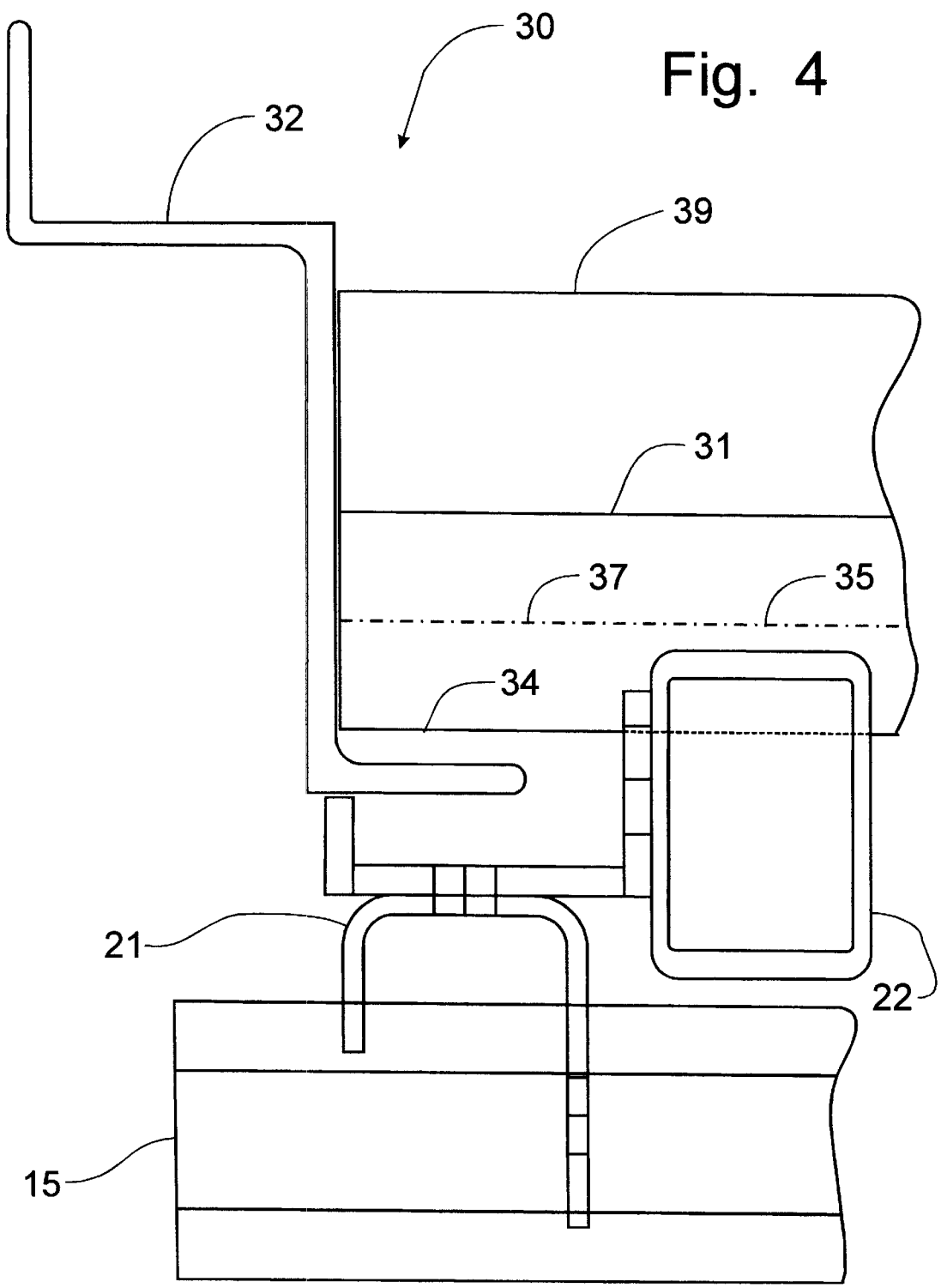
FIG. 4 is a cross-sectional view corresponding to lines 4—4 of FIG. 3 to depict an elevational view of one side of the trailer frame.

The elevational details of the trailer frame 11 can best be seen in the cross-sectional view of FIG. 4. The trailer bed frame 30 is positioned on top of the tilt frame 20. The transverse bed frame members 31, 34, 35 and 37 have different thicknesses, as are represented by the lines shown in FIG. 4. All of the transverse frame members 31, 34, 35, 37 of the trailer bed frame 30 terminate in a common plane forming the top surface of the trailer bed frame 30 so as to provide a planar surface 39 on which to mount the planking forming the bed (not shown) of the trailer 10. The forwardmost transverse frame member 35 and the second transverse frame member 37 have a thickness that terminates just above the side rails 22 of the tilt frame 20. The central traverse frame members 31 have smaller cross-sections and greater clearance above side rails 22. The rearwardmost transverse frame member 34 has the largest cross-sectional configuration as there is no primary frame component immediately beneath the frame member 34. The mounting flanges 21 are depicted as interconnecting the side rails 22 of the tilt frame 20 and the axle 15. The side rails 32 of the trailer bed frame 30 nest over top of the mounting flanges 21 just outboard of the side rails 22 of the tilt frame 20.

Figure 5:
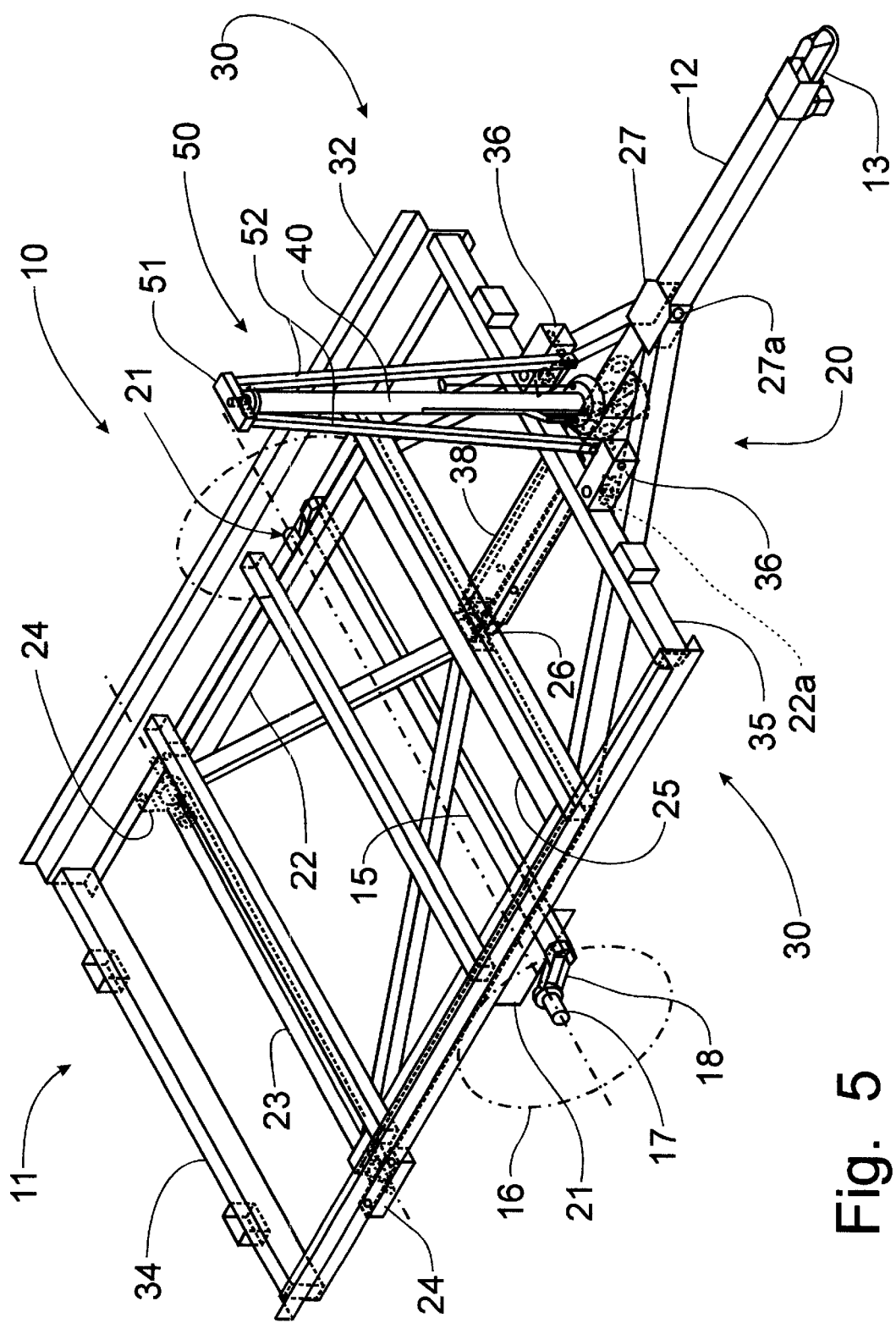
FIG. 5 is a schematic right front perspective view of the trailer frame of FIG. 3 with a bottle jack added to provide an actuator for the dump and tilt functions of the trailer frame.
Figure 6:
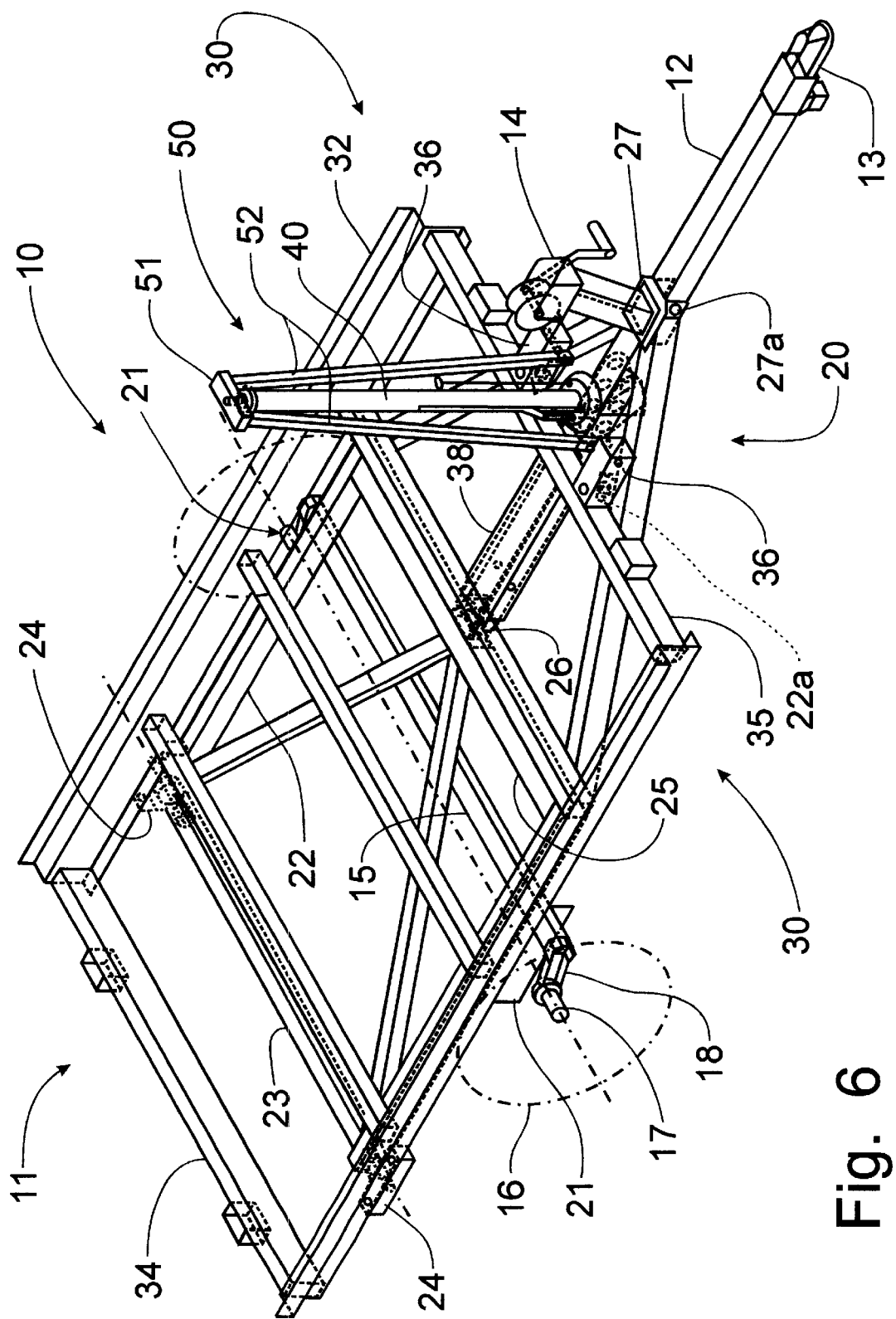
FIG. 6 is a schematic right front perspective view of the trailer frame of FIG. 5 with an optional winch added to the tilt frame forwardly of the bottle jack.

FIG. 5 depicts the mounted location of the bottle jack 40, connected to the bottle jack mounting brackets 57 affixed to the tongue 12. The details of the bottle jack 40 and the relationship thereof to the trailer frame 11 will be described in connection with FIGS. 7–12 below. One skilled in the art will recognize that the bottle jack 40 is depicted in FIG. 5 in a normal operating position, capable of lifting the trailer bed frame 30 relative to the tilt frame 20 about the dump axis 29. While the bottle jack 40 is preferred because of its simplicity and economy, other hydraulic or electric actuators could also be substituted equally for the bottle jack 40. In FIG. 6, an optional winch 14 is depicted as being mounted on the tilt frame 20 forwardly of the bottle jack 40, preferably mounted on the lock bracket 27. Preferably, the winch 14 is formed with bolts or connectors (not shown) depending downwardly therefrom to engage slots (not shown) formed in the lock bracket 27 that can receive the bolts (not shown) to provide a quick-attach system for the winch 14. The winch 14 must be detachable to permit the bottle jack 40 to be reclined into an inoperative horizontal position, as will be described in greater detail below. The winch 14 can be operable with the bottle jack 40 in the upright position as the cable can pass between the bottle jack 40 and the legs 52 of the yoke 50.

Figure 7:
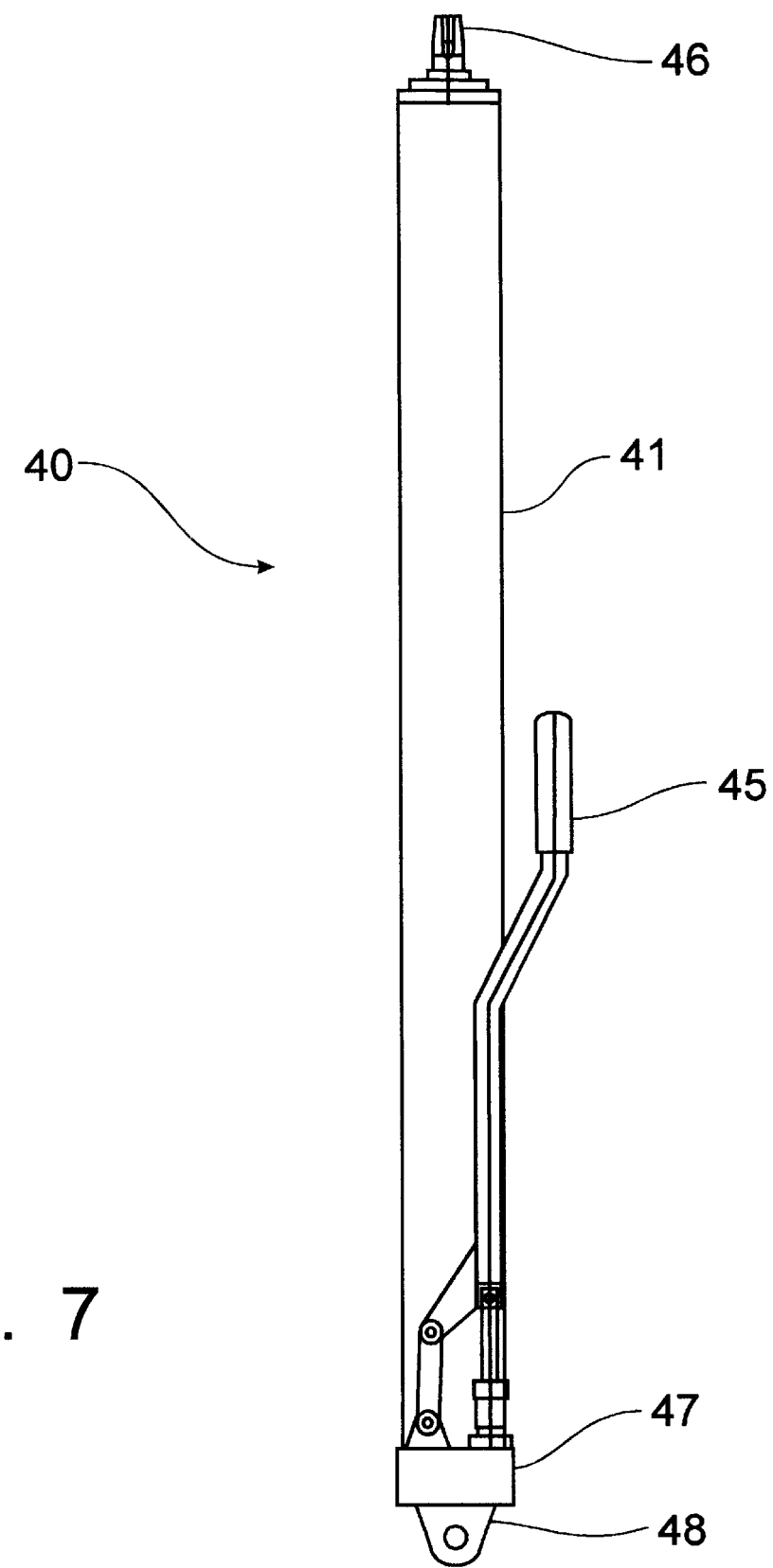
FIG. 7 is an enlarged side elevational detail view of the bottle jack.
Figure 8:
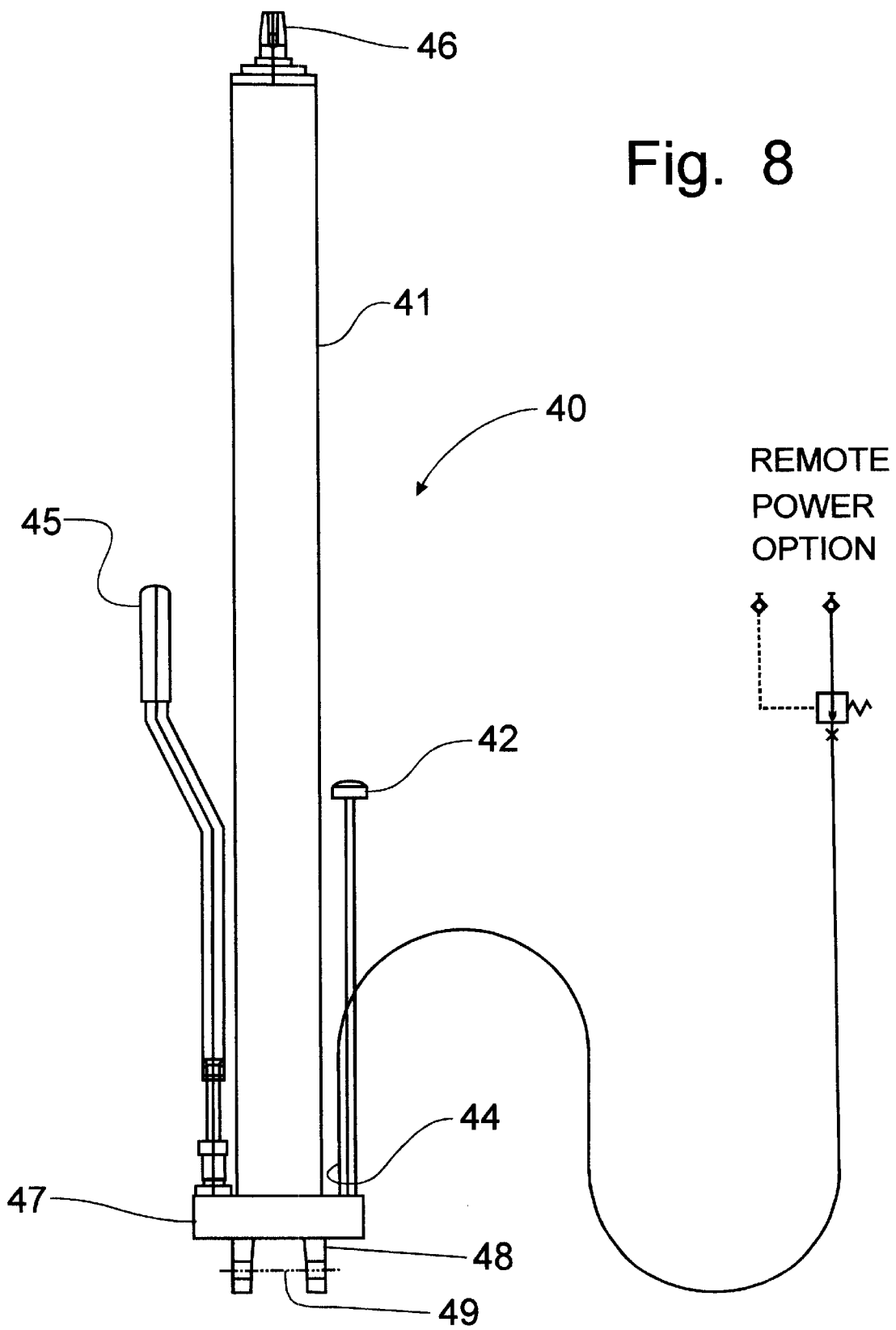
FIG. 8 is a front elevational view of the bottle jack depicted in FIG. 7 with a remote power option being depicted.

An extended stroke bottle jack 40 is depicted in FIGS. 7 and 8, with modifications to provide a more convenient pressure release valve 42, an integral pump handle 45 and an optional fitting 44 for connection to a remote power source. The bottle jack 40 includes a handle 45 for pumping hydraulic fluid from an internal reservoir into the conventional operative internal chambers of the bottle jack 40, causing the tip 46 at the distal end of the bottle jack 40 to extend upwardly. Manipulation of the pressure release valve 42 will allow the hydraulic fluid to return to the internal reservoir and permit the tip 46 to contract back to the housing 41. The base 47 of the bottle jack 40 includes a clevis 48 adapted for pivotal connection to a support member, which in this configuration would be the tongue 12 in a manner described below. Preferably, the bottle jack 40 will be equipped with an optional fitting 44 that will allow the bottle jack 40 to be connected to a remote hydraulic system, such as on a tractor or the like (not shown), for operation thereof in lieu of the manipulation of the pump handle 45 and pressure release valve 42. The release valve 42 will preferably be adapted to extend to a greater height above the base 47 to permit a convenient operation without requiring the operator to place his hands into the area of moving frame components.

Figure 9:
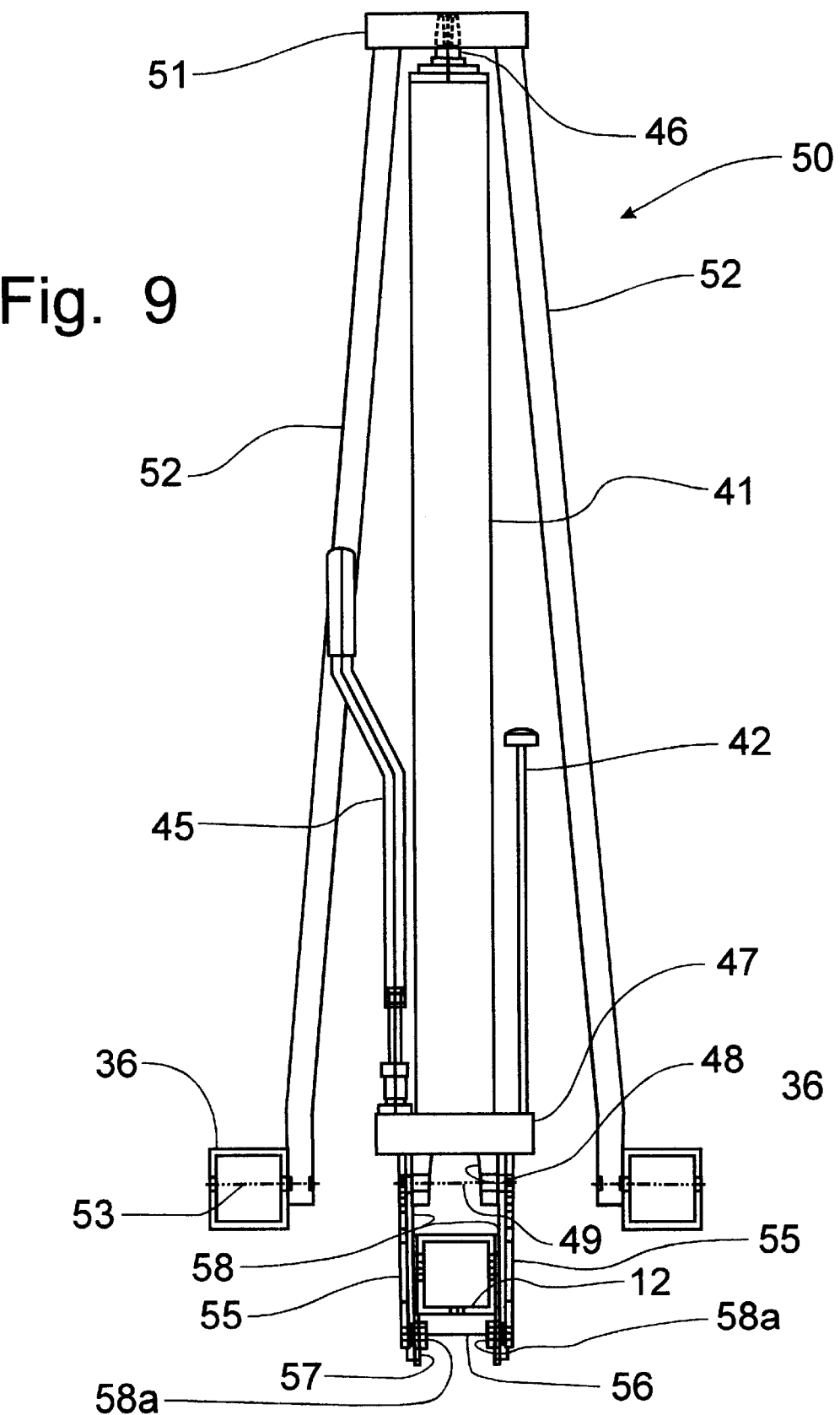
FIG. 9 is an enlarged front elevational view of the bottle jack shown in FIG. 5, the trailer bed frame being represented by the mounting members, the remainder of the trailer frame being deleted for purposes of clarity.
Figure 10:
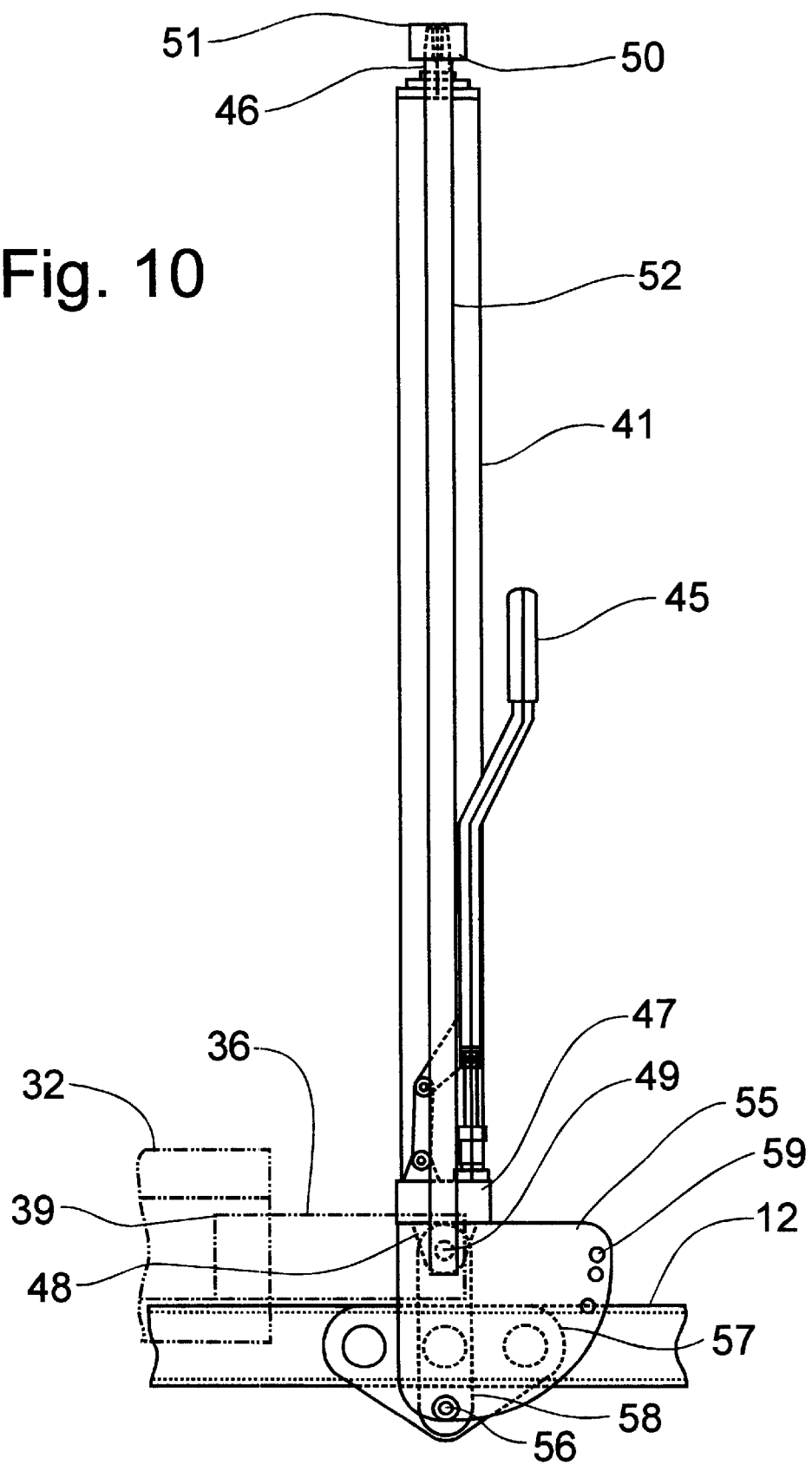
FIG. 10 is a side elevational view of the mounting of the bottle jack depicted in FIG. 9, the bottle jack being shown in an upright operative position.

The mounting of the bottle jack 40 is best seen in FIGS. 9–12. The clevis 48 is mounted by a pivot bolt 49 to a pair of upright links 58 pivotably supported on hubs 58a mounted in the bottle jack mounting brackets 57 and positioned on opposing sides of the tongue 12. The upright links 58 transfer the load exerted on the bottle jack 40 through the hubs 58a to the bottle jack mounting brackets 57 and, therefore, to the tongue 12. A pivot control quadrant 55 fixed to the base 47 of the bottle jack 40 on each side of the tongue 12 is also mounted on the pivot bolt 49 for pivotal movement in concert with the base 47 of the bottle jack 40. The quadrants 55 extend vertically below the tongue 12 and restrain the bottle jack 40 in pivotal relationship with upright links 58 by a restraining pin 56 interengaging the quadrants 55, the upright links 58 and the bottle jack mounting brackets 57 beneath the tongue 12. As shown in FIGS. 9 and 10, the axes of the pivot bolt 49, restraining pin 56 and bottle jack 40 are secured in a common plane.

A yoke 50 has an elevated bight portion 51 connected to the tip 46 by a fastener (not shown). A pair of legs 52 extend downwardly from the bight portion 51 for pivotal connection to the mounting members 36 projecting forwardly from the forwardmost transverse frame member 35 of the trailer bed frame 30. The pivot axis 53 passes through the pivotal connection between the legs 52 of the yoke 50 and the mounting members 36, the axis of bottle jack 40 and approximately concentrically through the pivot bolt 49 fastening the clevis 48 of the bottle jack 40 to the upright links 58. The upright alignment of the bottle jack 40 follows the upward movement of the trailer bed reflecting the upward movement of the pivot axis 53 passing through the pivotal connection between the legs 52 and mounting members 36. The upright links 58 are pivotable with the quadrants 55 about the restraining pin 56 defining the pivot axis carried by the bottle jack mounting brackets 57. The bight portion 51 is rigidly fastened to the tip 46 of the bottle jack 40 so the extension of the tip 46 from the bottle jack 40 raises the yoke 50 and the connected trailer bed frame 30.

Figure 11:
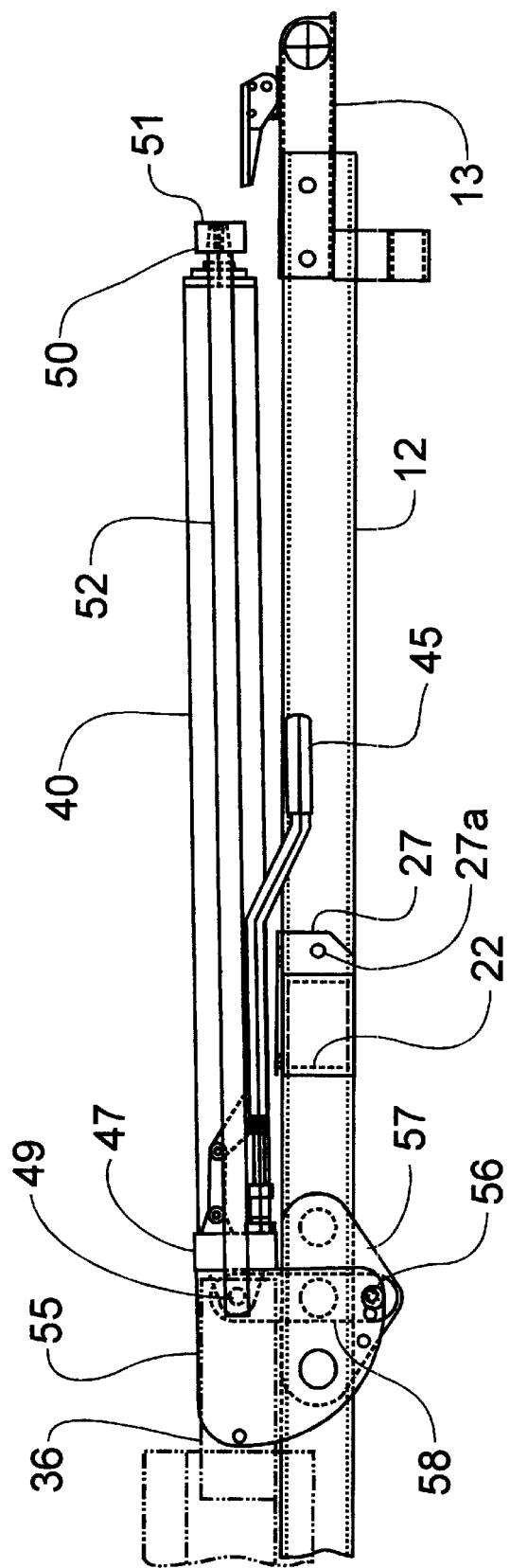
FIG. 11 is a side elevational view similar to that of FIG. 10 but with the bottle jack being lowered into a horizontal inoperative position on top of the tongue.
Figure 12:
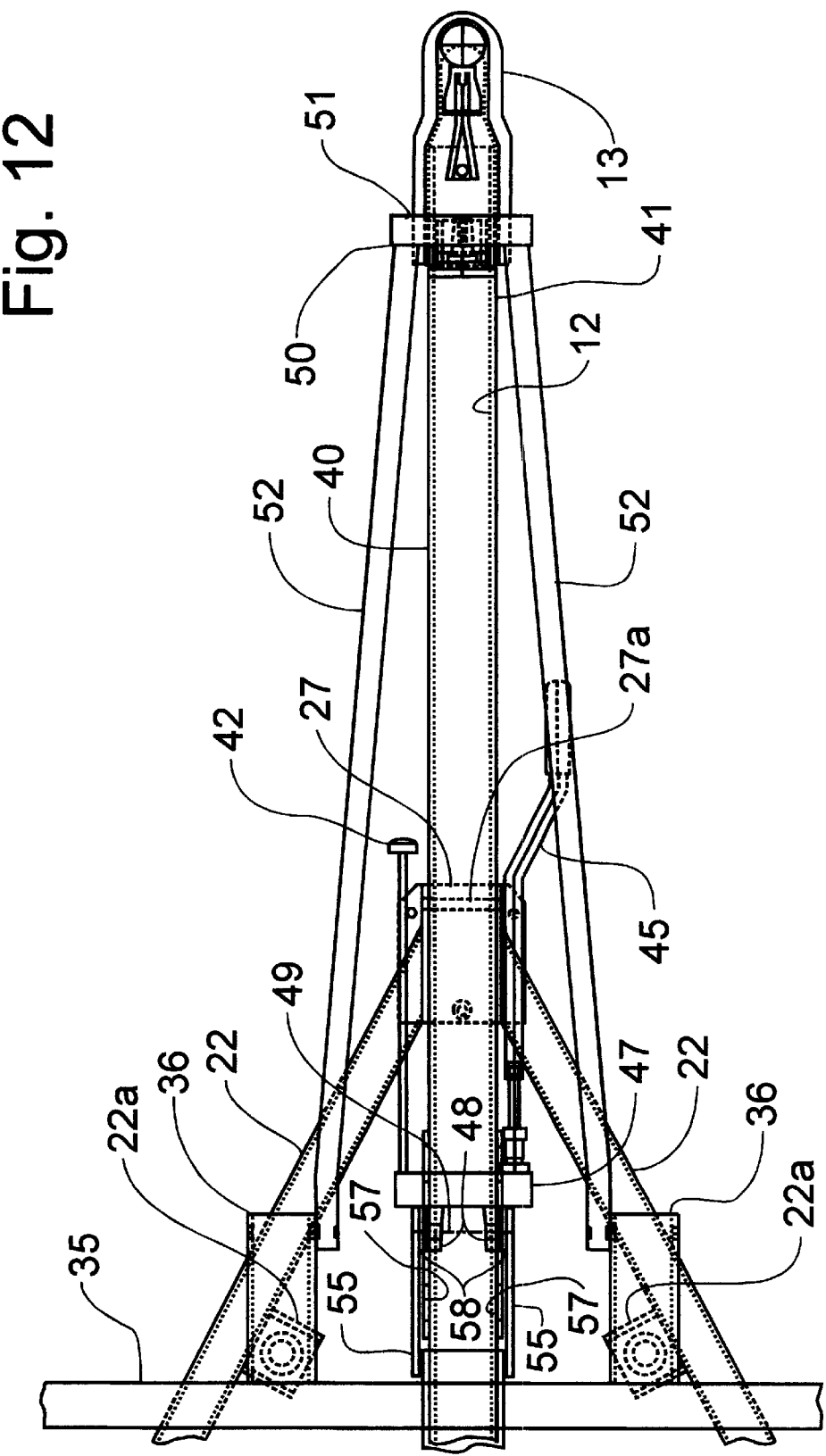
FIG. 12 is a top plan view of the bottle jack, tongue and front portion of the trailer frame shown in FIG. 11.

Particularly since the bottle jack 40 is of a construction that extends upwardly a substantial distance above the tongue 12, the bottle jack 40 in the upright operative position can be in the way of the loading some materials onto the trailer bed (not shown). Accordingly, it would be desirable to provide a mechanism for allowing the bottle jack 40 to be moved into a non-intruding inoperative position in such circumstances. The mounting apparatus described above provides such a mechanism. When the bottle jack 40 is desired to be moved into a lowered inoperative position, the restraining pin 56 is removed from engagement with the pivot control quadrants 55, upright links 58 and the bottle jack mounting brackets 57 to allow the bottle jack 40 and the affixed pivot control quadrants 55 to pivot about the pivot bolt 49. The connected yoke 50 will also pivot on its respective connection to the mounting members 36 about the concentric pivot axis 53 to allow the entire bottle jack 40 and connected yoke 50 to be lowered to a horizontal position on top of the tongue 12, as is depicted in FIGS. 11 and 12.

While lowering bottle jack 40 and the connected yoke 50, a limited amount of misalignment between pivot bolt 49 and pivot axis 53 can be accommodated as the upright links 58 can pivot relative to the bottle jack mounting brackets 57. Furthermore, strain within the legs 52 will allow the axis of bottle jack 40 to slightly misalign with the pivot axis 53. A reinstallation of the restraining pin 56 into aligned quadrant holes 59 and through the upright links 58 and the bottle jack mounting brackets 57 will retain the bottle jack 40 and attached yoke 50 in the lowered position. One skilled in the art will readily recognize that the optional winch 14, if installed on the tongue 12, would have to be removed before the bottle jack 40 and yoke 50 could be lowered to the inoperative transport position.

Figure 13:
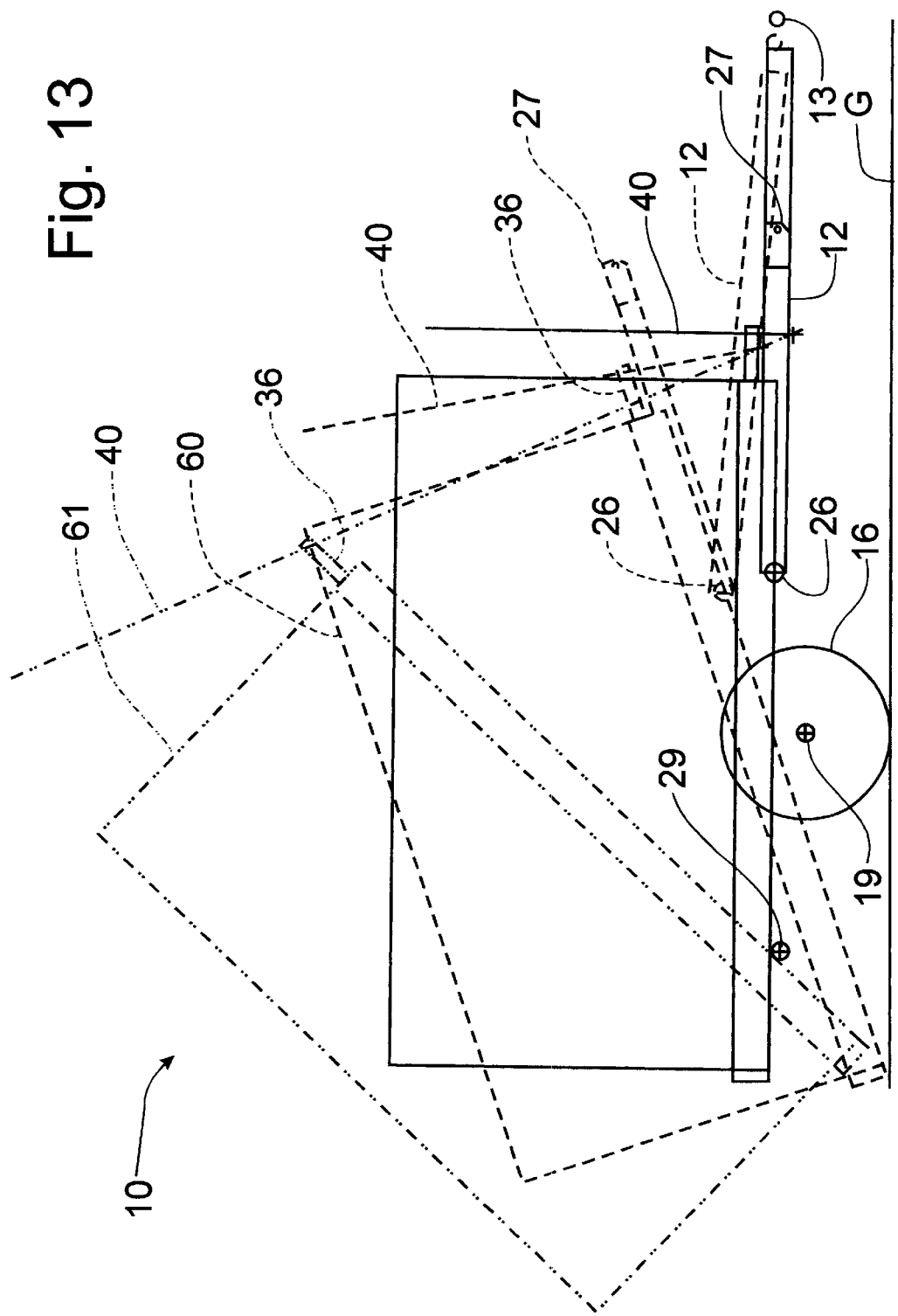
FIG. 13 is a schematic side elevational view of the trailer incorporating the principles of the instant invention and depicting both the tilt function and the alternate dump function of the trailer relative to a normal transport position.

Referring now to all the drawings, but particularly the schematic multi-positional drawing of FIG. 13, the operation of the trailer 10 in both the tilt and dump functions can be seen. Referring first to the tilt position 60 of the trailer 10, the operator must remove the fastener device 27a (best seen in FIGS. 1, 3, 5, 6, 11 and 12) interengaging the lock bracket 27 and the tongue 12 to permit the tongue 12 to articulate about its pivotal connection with the pivot bracket 26. Since the trailer bed frame 30 is still fixed to the tilt frame 20 by virtue of the pins connecting the locking tabs 22a to the mounting members 36, the trailer bed frame 30 will tilt with the tilt frame 20 about the tilt axis 19 defined by the spindles 17. The tip 46 of the bottle jack 40 is free to extend from the housing 41, thereby allowing the yoke 50 to move upwardly with the mounting members 36 to which it is attached. The bottle jack 40 is pivotable on the hubs 58a supporting the upright links 58 on the bottle jack mounting brackets 57, allowing the bottle jack 40 to rotate rearwardly to accommodate the upward and rearward movement of the mounting members 36. Once the trailer 10 is returned to the normal home position, the fastener 27a can be re-engaged between the lock bracket 27 and the tongue 12.

Re-configuring the trailer 10 to permit the dump function to operate requires the removal of the pins (not shown) interconnecting the locking tabs 22a and the mounting members 36, thereby releasing the trailer bed frame 30 for pivotal movement relative to the tilt frame 20 about the dump axis 29 for the positioning thereof in a dump position 61, shown in FIG. 13. To force the raising of the trailer bed frame 30, the bottle jack 40 can be pressurized by stroking the pump handle 45, or by connecting the optional fitting 44 to a remote source of hydraulic power, resulting in an extension of the tip 46 from the housing 41. The attached yoke 50, the legs 52 of which extend downwardly for connection to the mounting members 36, then rises with the tip 46 and draws the forwardmost transverse frame member 35 of the trailer bed frame 30 upwardly, rotating about the dump axis 29 carried by the rear transverse frame member 23 of the tilt frame 20. As with the tilt function above, the bottle jack 40 is pivotable about the hub connection 58a between upright links 58 and the bottle jack mounting brackets 57 to allow the bottle jack to rotate rearwardly to accommodate the upward and rearward motion of the forwardmost transverse frame member 35 as it pivots about the dump axis 29.

Figure 14:
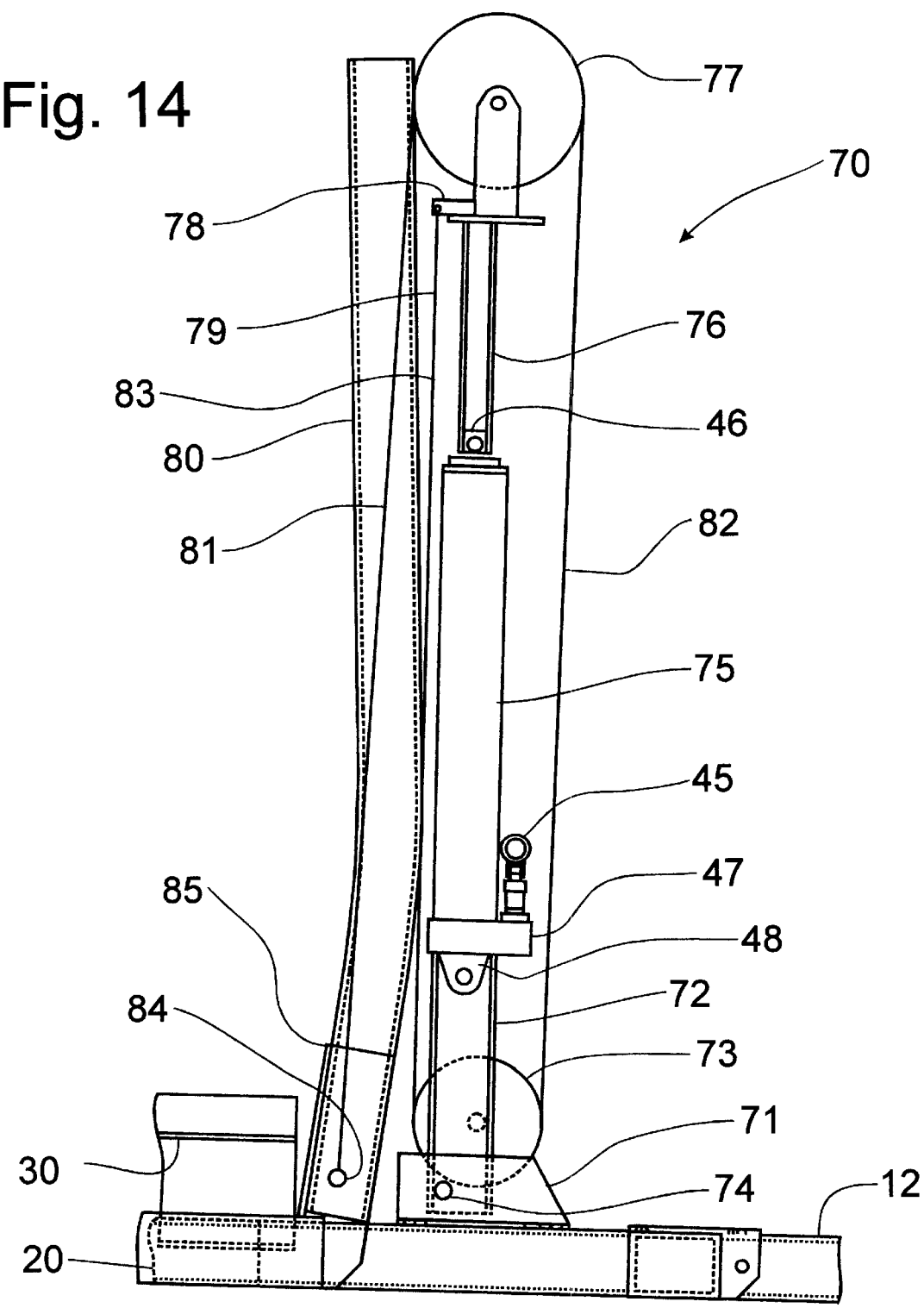
FIG. 14 is a side elevational view similar to that of FIG. 10, but depicting an alternative trailer bed lift jack arrangement utilizing a cable lift system.
Figure 15:
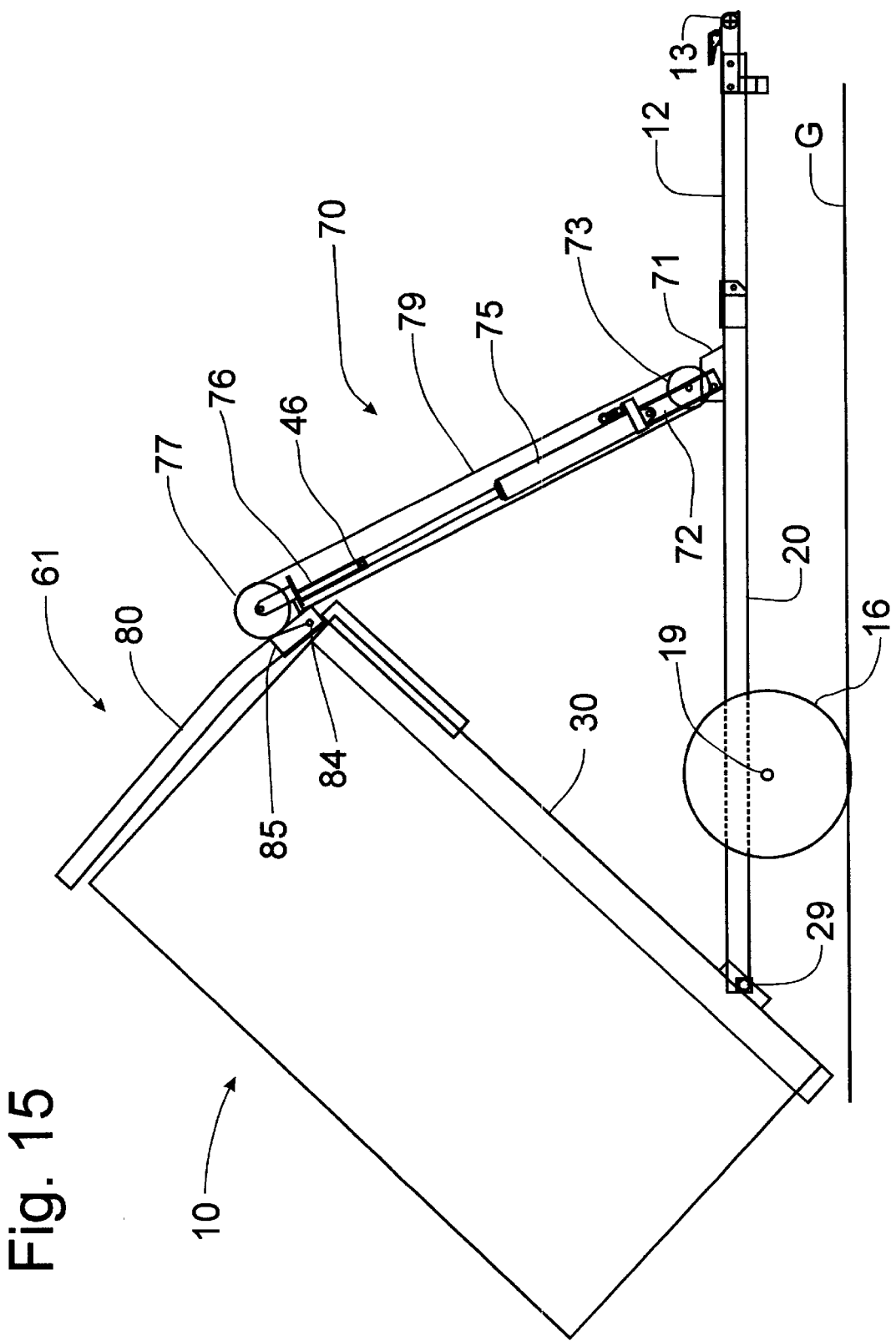
FIG. 15 is a schematic side elevational view of the trailer moved into a dump position by the alternative trailer bed lift jack and cable lift system of FIG. 14.

Referring now to FIGS. 14 and 15, an alternative trailer bed lift jack assembly 70 can best be seen. A jack support 71 is fixed to the top of the tongue 12, preferably by welding. The assembly 70 includes a jack post 72 fixed to the base 47 of the hydraulic jack 75 to elevate the base 47 of the hydraulic jack 75 above the tongue 12 a sufficient distance to locate a lower pulley 73 rotatably mounted on the jack post 72 at a position forwardly of the centerline of the lift jack assembly 70. The jack post 72 is pivotally connected to the jack support 71 by a pivot pin 74. A rod extension 76 is fixed to the tip 46 of the hydraulic jack 75 to rotatably mount an upper pulley 77 at a position spaced above the tip 46. The rod extension 76 also provides a cable mount 78 to which is affixed the end of a cable 79 that is entrained around the lower pulley 73, then entrained around the upper pulley 77 and connected to the trailer bed frame 30.

The front wall of the trailer 10 is provided with a cam track 80 that is centrally mounted above the tongue 12 in register with the upper pulley 77. The cam track 80 is preferably formed as a reinforced leg channel configured in a "C-shape" so as to allow the cable 79 to pass into the cam track 80, but not the upper pulley 77 which rides on top of the cam track 80. The base of the cam track 80 is supported by the trailer bed frame 30 and provides the connection point for the distal end of the cable 79 for lifting the trailer bed in a manner to be described in greater detail below. Both the lower and upper pulleys 73, 77 and the pivot pin 74 between the jack post 72 and the jack support 71 are offset from the centerline of the lift jack assembly 70, the pulleys 73, 77 being offset forwardly of the centerline and the pivot pin 74 being rearwardly of the centerline, to reduce the bending moment on the piston of the hydraulic jack 75 and the moment urging the lift jack assembly 70 against the cam track 80 since two strands of the cable 79 are rearward of the hydraulic jack 75 and one strand is forward thereof.

The cam track 80 provides a track against which the upper pulley 77 rides as the trailer bed is being raised by the action of the lift jack assembly 70. The cam track 80 prevents the lift jack assembly 70 and the third strand 83 of the cable 79 from rubbing against the bottom corner of the trailer bed. Preferably, the cam track 80 is detachable and is supported on a cam support 85 by a pin 84 that also attaches the cable 79 to the trailer bed frame 30. Removal of the connecting pin 84 and the pivot pin 74 enables the entire lift assembly 70 and cam track 80 to be removed from the trailer 10.

Operation of the lift assembly 70 effects a multiplication of the stroke of the hydraulic jack 75 through the three strands 81, 82, 83 of the cable 79. As is best seen in the schematic view of FIG. 15, a 22.5 inch stroke of the hydraulic jack 75 will lift a standard trailer bed 67.5 inches to provide a 47 degree dump angle for the trailer bed. The upper pulley 77 maintains constant contact with the cam track 80 throughout the lifting operation, primarily due to the forces exerted by the first and third strands 81, 83 of the cable on the rearward side of the hydraulic jack 75, which is offset only by the force exerted on the second strand 82 forwardly of the hydraulic jack 75. The arrangement depicted in FIG. 15 provides substantially the same moment arm for the lift force exerted on the cable 79 about the dump axis 29 at the top of the stroke of the hydraulic jack 75 with the trailer bed at the maximum dump angle as at the bottom of the stroke with the trailer bed in a transport position.

While the intent of the alternate lift jack assembly 70 described above is to substitute for the bottle jack 40, the trailer 10 would still be able to provide both the tilt and dump functions due to the frame arrangements 20, 30 described above. Removal of the alternate lift jack assembly 70 is preferred if the hydraulic jack 75 would be in the way of hauling a long load on the trailer bed, as opposed to the function of lowering the bottle jack 40 described above. However, lowering the alternative lift jack assembly 70 can also be accomplished if sufficient slack is provided for the cable 79, as the alternative lift jack assembly 70 can be pivoted about the pivot pin 74. It will be noted by one skilled in the art, however, that the height of the pulleys 73, 77 could still present a clearance problem for a long load, which is why a removal of the assembly 70 is preferred.

Figure 16:
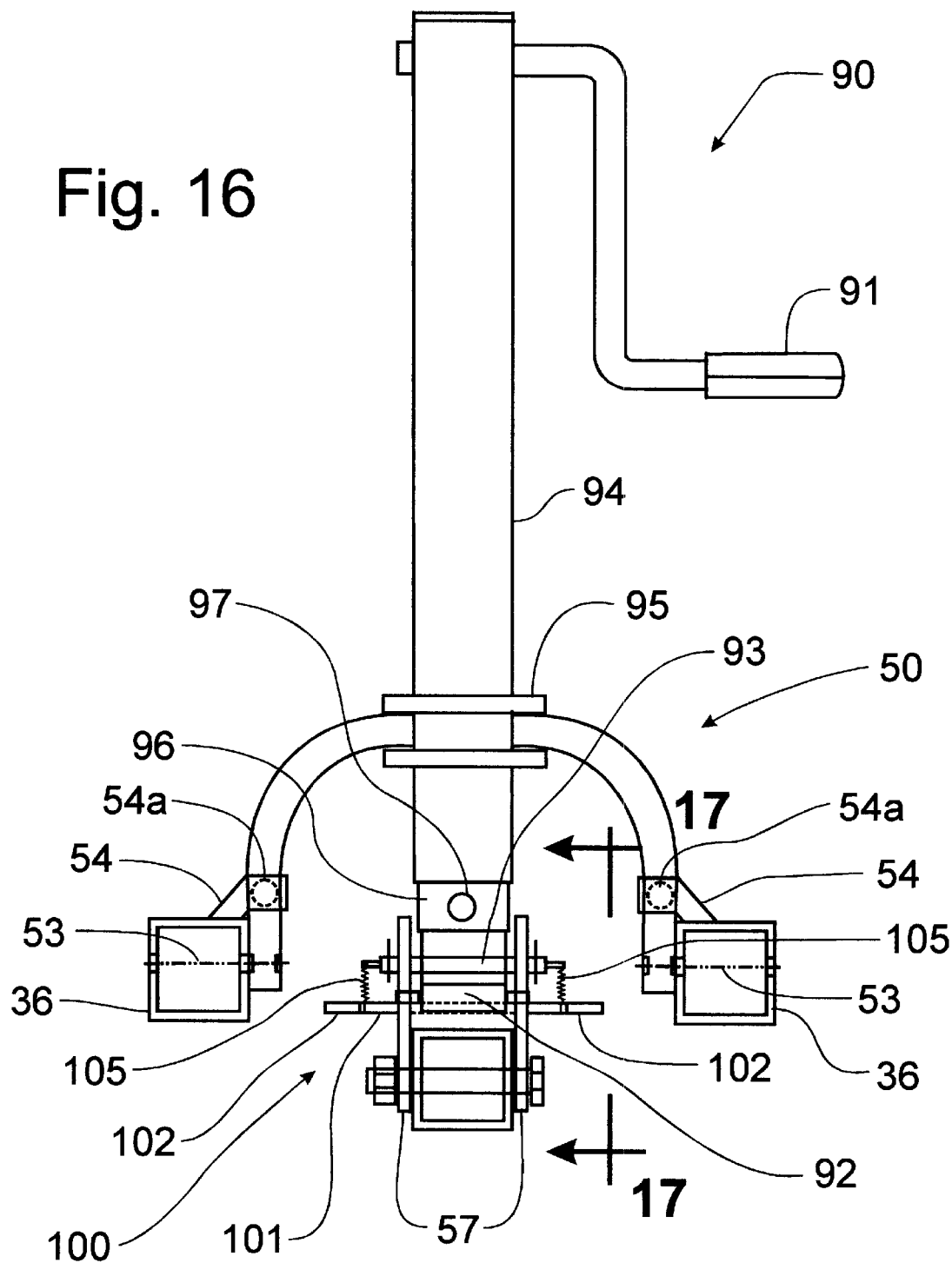
FIG. 16 is front elevational view of a screw jack actuator operable to provide an assist to the tilt function of existing gravity-based tilt trailers, the trailer bed frame being represented by the mounting members, the remainder of the trailer frame being deleted for purposes of clarity.
Figure 17:
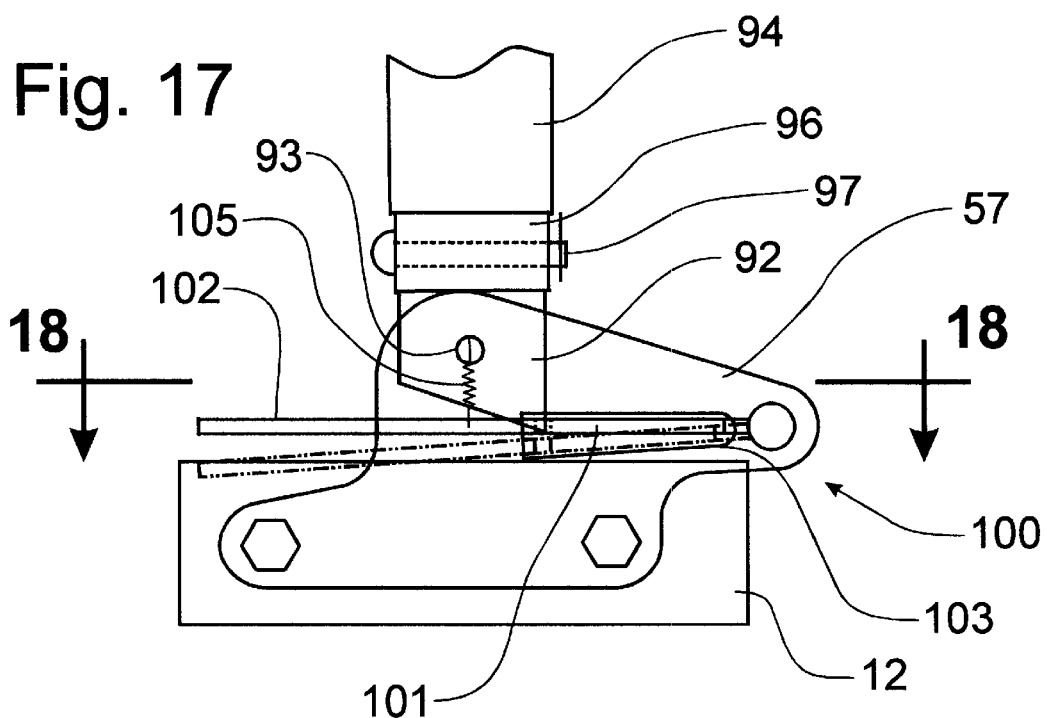
FIG. 17 is a side elevational view of the latch mechanism for the screw jack actuator corresponding to lines 17—17 of FIG. 16.
Figure 18:
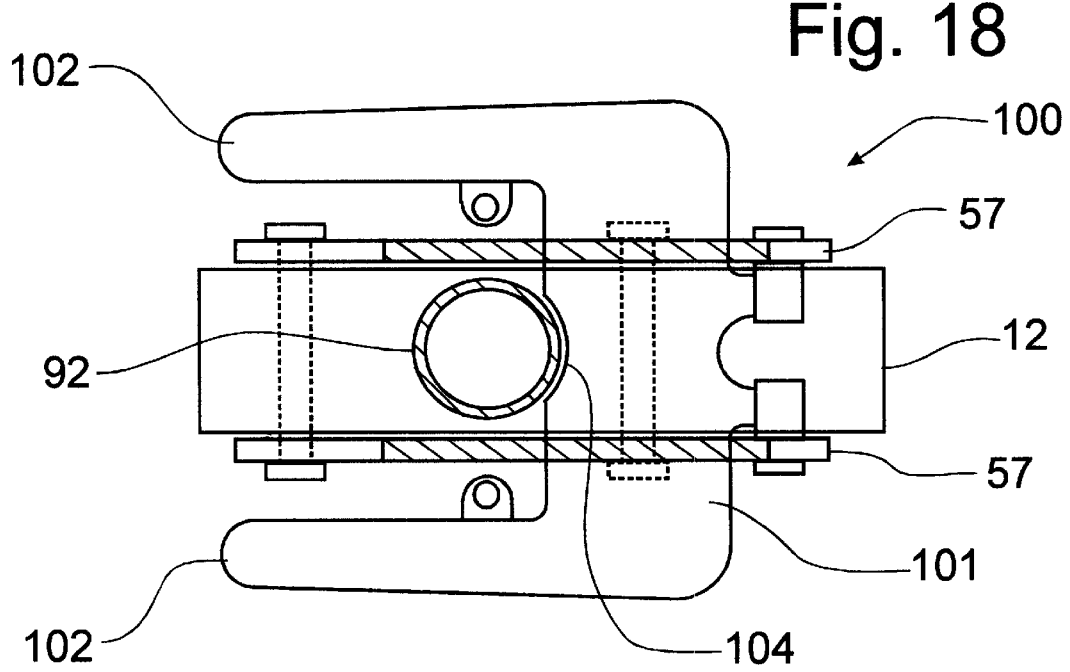
FIG. 18 is a cross-sectional view of the screw jack actuator corresponding to lines 18—18 of FIG. 17 to depict a top plan view of the latch mechanism.

Referring now to FIGS. 16–18, a screw jack actuator 90 that can be utilized to provide a mechanical assist to the tilt function of a conventional gravity-based tilt trailer is best seen. The screw jack actuator 90 is an inexpensive extensible actuator that, with the other parts defined below, can be marketed as an after-market kit for use with previously existing tilt trailers. The screw jack actuator 90 is extensible and contractible in a conventional manner through operation of a crank handle 91 positioned at the top of the actuator 90. Manual rotation of the crank handle 91 telescopically extends the bottom tip 92 of the actuator 90 which is fastened via a pivot pin 93 to the mounting brackets 57 affixed to the opposing sides of the trailer tongue 12. As a result, the outer casing 94 of the screw jack 90 raises vertically. Since the yoke 50 is attached to a collar 95 fixed to the outer casing 94, and since the legs 52 of the yoke 50 are connected to the mounting members 36, the trailer bed pivots about the tilt axis as defined above to provide the tilt operation for the trailer 10.

The bottom tip 92 is pinned to the telescopic section 96 that extends from the outer casing upon appropriate rotation of the crank handle 91 by a connecting pin 97. When pinned, the bottom tip 92 fixes the telescopic section 96 to the mounting brackets 57 for extension and contraction in a normal manner. Removal of the pin 97 enables the bottom tip 92 to slide relative to the telescopic section 96 irrespective of the operation of the crank handle 91. As a result, the removal of the pin 97 allows the outer casing 94 to freely move relative to the bottom tip 92 which has a substantial length extending into the telescopic section 96. Thus, the trailer bed is free to move with the force of gravity or other external force to effect pivotal movement about the tilt axis. Accordingly, removal of the connecting pin 97 allows the conventional tilt trailer to operate in the conventional manner as though the screw jack 90 were not attached.

The bottom tip 92 is beveled, as is best seen in FIG. 17, to form a cam surface for interaction with the latching mechanism 100. The latching mechanism 100, which can be utilized with the bottle jack actuator 40 described above, is required because the actuator 90 is not stabilized by spaced apart pivots 49, 56 as is described above with respect to the bottle jack 40. The latching mechanism 100 serves as a forward stop apparatus to control or restrict the forward pivotal movement of the actuator 90 and includes a latch plate 101 pivotally supported on the mounting brackets 57 and defining actuating levers 102 that project outwardly and forwardly through slots 103 formed in the mounting brackets 57. The latch plate 101 is formed with a concave cutout 104 that conforms to the size and shape of the bottom tip 92 for engagement therewith to restrict pivotal movement of the screw jack 90 toward the lowered transport position, as is described above with respect to the bottle jack 40. A pair of springs 105 interconnect the opposing ends of the pivot pin 93 with the corresponding actuation levers 102 to bias the levers 102 toward a raised position that interferes with the pivotal movement of the screw jack 90.

A pair of stops 54 limit the rearward movement of the yoke 50 and connected screw jack 90 to prevent the screw jack 90 from tipping rearwardly too far. Accordingly, the screw jack 90 is trapped in the upright operative position between the stops 54 which restrict rearward pivotal movement of the actuator 90 and the latching mechanism 100 which restricts and controls the forward pivotal movement of the actuator 90. Preferably the stops 54 are affixed, such as by welding, to the mounting members 36 and include adjustable heads 54a, such as a carriage bolt, threaded into the stop 54 to engage the legs 52 of the yoke 50. The adjustable heads 54a permit the stop to be reoriented for proper effectiveness. The latch mechanism 100 serves as a forward stop apparatus to limit the forward position of the screw jack 90 when placed in the upright operative position, thus trapping the screw jack 90 between the latch plate 101 and the stops 54.

In operation, the screw jack 90 (or bottle jack 40) can be lowered to the inoperative transport position by depressing one of the actuation levers 102 to overcome the biasing force exerted by the springs 105. The resulting pivotal movement of the latch plate 101 disengages the cutout 104 from the bottom tip 92 and allows the screw jack 90 to pivotally move about the axis 53 defined by the pivotal connection between the yoke legs 52 and the mounting members 36. Returning the screw jack actuator 90 to the upright operative position is simply a matter of manually raising the screw jack 90. The beveled cam surface of the bottom tip 92 engages the latch plate 101 to cause the latch plate 101 to deflect downwardly against the biasing force exerted by the springs 105 until the screw jack 90 reaches the upright position at which point the bottom tip 92 falls within the concave cutout 104 allowing the latch plate 101 to snap back into engaging position by the biasing force exerted by the springs 105, trapping the screw jack 90 between the latch plate 101 and the stops 54.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiments of the invention; however, concepts, as based upon the description, may be employed in other embodiments without departing from the scope of the invention.

In the way of example, one skilled in the art will recognize that the principles of the invention described above can be utilized on substantially any vehicle or apparatus having a load bed or other member that is pivoted relative to a frame. More specifically, these principles can be used to provide a dump bed on a pick-up or dump truck (not shown). The actuator 40 or 90 would be trapped between the bed of the pickup truck and the cab with the yoke 50 pivotally connected to the bed. Furthermore, by inserting an articulating tilt frame between the bed and the chassis of the truck, both tilt and dump functions could be selectively provided for the truck.

Also, the actuator could be in the form of a bottle jack 40, which has its own internal reservoir of hydraulic fluid, a mechanically operated screw jack 90, or other actuators such as a conventional hydraulic cylinder with an external port adapted for connection to a remote source of hydraulic power. Furthermore, the hydraulic cylinder could be mounted upside down, as compared to the depiction of the actuators 40 and 75 in the drawings, with the rod extending downwardly. In such a configuration, the hydraulic cylinder could have the hydraulic fluid supplied through a hydraulic connector associated with a hollow rod so that the port and associated hoses do not have to move vertically with the barrel of the hydraulic cylinder.

Still further, the yoke does not have to mount to the top of the actuator rod, but can be connected to the bottom of the hydraulic component moving vertically, particularly where the hydraulic cylinder is mounted upside down as described above. A similar configuration is shown and described above with respect to the screw jack 90. A low profile configuration with the yoke mounted to the bottom of the vertically movable barrel would be particularly desirable with respect to the adaptation of the principles of the invention disclosed above in conjunction with a pick-up or dump truck.

Having thus described the invention, what is claimed is:
1. A trailer comprising:
an articulated frame having at least a pair of transversely opposed wheels rotatable about an axis of rotation, said articulated frame including a tilt frame pivotable about a tilt pivot axis and a draft tongue pivotally connected to said tilt frame for pivotal movement about an articulation axis located forwardly of said tilt pivot axis, said draft tongue being adapted for connection to a prime mover; and
a bed frame supported on said articulated frame for selective pivotal movement relative to said articulated frame about a dump pivot axis oriented rearwardly of said tilt pivot axis, said bed frame being selectively movable with said tilt frame about said tilt pivot axis.

2. The trailer of claim 1 wherein said bed frame is also connected to said articulated frame by a connection apparatus positioned forwardly of said tilt pivot axis to restrict pivotal movement of said bed frame relative to said tilt frame, said articulated frame including a locking device selectively coupling said tilt frame to said draft tongue to restrict pivotal movement of said tongue relative to said tilt frame about said articulation axis.

3. The trailer of claim 2 wherein said bed frame moves vertically relative to said draft tongue when pivoting about said tilt axis and when pivoting about said dump axis, said tilt frame moving vertically relative to said draft tongue only when said bed frame pivots about said tilt axis.

4. The trailer of claim 3 further comprising:
an actuator mechanism supported on said tongue and coupled to said bed frame to power the pivotal movement of said bed frame about at least one of said dump pivot axis and said tilt pivot axis.

5. The trailer of claim 4 wherein said actuator mechanism comprises:
a mounting bracket affixed to said tongue;
a linear actuator supported on said mounting bracket; and
a yoke connected to said actuator for vertical movement thereof in response to a corresponding linear movement of said actuator, said yoke being pivotally connected to said bed frame to cause vertical movement thereof in response to said linear movement of said actuator.

6. The trailer of claim 5 wherein said actuator is pivotally connected to said mounting bracket for pivot movement about a generally horizontal actuator pivot axis positioned in general transverse alignment with a yoke pivot axis defined by the pivotal connection of said yoke with said bed frame, such that said actuator is pivotally movable between an upright operative position and a lowered inoperative position oriented generally parallel to said draft tongue.

7. The trailer of claim 6 wherein said actuator is pivotally connected to said mounting bracket by a pivot pin located at a position vertically spaced from said actuator pivot axis.

8. The trailer of claim 6 wherein said actuator is pivotally connected to said mounting bracket by a pivot pin, said pivot pin defining said actuator pivot axis.

9. The trailer of claim 6 wherein said bed frame is positioned above said tilt frame, said dump pivot axis being defined by a pivot mechanism connecting said bed frame to said tilt frame, said pivot mechanism including a pair of laterally opposing support members pivotally supported in a rear frame member of said tilt frame.

10. The trailer of claim 9 wherein said actuator is operatively associated with a latch mechanism for controlling the pivotal movement thereof between said upright operative position and said lowered inoperative position.

11. The trailer of claim 10 wherein said actuator is oriented below a top surface of a load bed supported on said bed frame when placed into said lowered inoperative position.

12. The trailer of claim 10 wherein said actuator has an internal reservoir for hydraulic fluid, said actuator being provided with a manually operable hand pump to effect extension of said hydraulic actuator.

13. The trailer of claim 12 wherein said actuator includes a connection device for connection to a remote supply of hydraulic power.

14. An actuating mechanism for use with a frame and a load bed pivotally movable about a pivot axis relative to said frame, comprising:

a mounting bracket affixed to said frame;

a linear actuator pivotally supported on said mounting bracket for pivot movement about a generally horizontal actuator pivot axis; and a yoke connected to said actuator and pivotally connected to said load bed by a pivot mechanism defining a yoke pivot axis to effect vertical movement of said load bed in response to a corresponding linear movement of said actuator.

15. The actuating mechanism of claim 14 wherein said actuator pivot axis is positioned in general transverse alignment with said yoke pivot axis so that said actuator is pivotally movable between an upright operative position and a lowered inoperative position.

16. The actuating mechanism of claim 15 wherein said actuator is pivotally connected to said mounting bracket by a pivot pin located at a position vertically spaced from said actuator pivot axis.

17. The actuating mechanism of claim 15 wherein said actuator is pivotally connected to said mounting bracket by a pivot pin, said pivot pin defining said actuator pivot axis.

18. The actuating mechanism of claim 17 wherein said actuator is a screw jack being extensible through manual manipulation of a crank handle.

19. The actuating mechanism of claim 18 wherein said actuator further comprises:

an outer casing;

a telescopic section extensible from said outer casing upon appropriate manipulation of said crank handle; and a bottom tip member slidably extensible from said telescopic section, said bottom tip being detachably connected to said telescopic section by a locking device such that a release of said locking device permits said telescopic section to freely slide on said bottom tip member to enable said load bed to move vertically through the application of forces other than through said actuator.

20. The actuating mechanism of claim 15 wherein said frame corresponds to a trailer having a draft tongue pivotally connected to said frame for movement about an articulation axis, said load bed being pivotally connected to said frame at a dump pivot axis located rearwardly of said articulation axis, said actuator causing an articulation between said draft tongue and said frame thereby effecting a pivotal movement of said load bed about a tilt pivot axis located between said articulation axis and said dump pivot axis.

21. The actuating mechanism of claim 20 wherein said actuator is operatively associated with a latch mechanism for controlling the pivotal movement thereof between said upright operative position and said lowered inoperative position, said lowered inoperative position being positioned below a top surface of said load bed.

22. The actuating mechanism of claim 21 wherein said actuator has an internal reservoir for hydraulic fluid, said actuator being provided with a manually operable hand pump to effect extension of said hydraulic actuator.

23. The actuating mechanism of claim 22 wherein said actuator includes a connection device for connection to a remote supply of hydraulic power.

24. The actuating mechanism of claim 14 wherein said actuator mechanism includes a hydraulic cylinder.

25. An apparatus comprising:

a frame supported above the ground by a pair of wheels rotatable about an axis of rotation;

a load bed pivotally connected to said frame for vertical movement relative thereto; and an actuator mechanism positioned forwardly of said load bed and being pivotally supported on said frame at an actuator pivot axis, said actuator mechanism including a yoke pivotally connected to said load bed for movement relative thereto about a yoke pivot axis oriented in substantial alignment with said actuator pivot axis.

26. The apparatus of claim 25 wherein said load bed includes a first stop apparatus positioned to restrict rearward pivotal movement of said actuator and a frame supported second stop apparatus positioned to restrict forward pivot movement of said actuator.

27. The apparatus of claim 26 wherein said second stop apparatus is a latch mechanism that can be selectively operated to allow said actuator mechanism to pivotally move forwardly from an upright operative position to a lowered inoperative position.

28. The apparatus of claim 27 wherein said actuator mechanism includes a screw jack being extensible through manual manipulation of a crank handle.

29. The apparatus of claim 28 wherein said screw jack comprises:

an outer casing;

a telescopic section extensible from said outer casing upon appropriate manipulation of said crank handle; and a bottom tip member slidably extensible from said telescopic section, said bottom tip being detachably connected to said telescopic section by a locking device such that a release of said locking device permits said telescopic section to freely slide on said bottom tip member to enable said load bed to move vertically through the application of forces other than through said crank handle.

30. The apparatus of claim 27 wherein said actuator mechanism includes a hydraulic actuator having an internal reservoir for hydraulic fluid, said hydraulic actuator being provided with a manually operable hand pump to effect extension of said hydraulic actuator.

31. The apparatus of claim 30 wherein said hydraulic actuator includes a connection device for connection to a remote supply of hydraulic power.

32. The apparatus of claim 26 wherein said actuator mechanism includes a hydraulic cylinder.

33. The apparatus of claim 32 wherein said hydraulic cylinder includes a connection device for connection to a remote supply of hydraulic power.

34. The apparatus of claim 27 further comprising:

a draft tongue adapted to be connected to a prime mover, said tongue being pivotally connected to said frame for articulation about an articulation axis positioned forwardly of said axis of rotation;

said load bed being pivotally mounted on said frame for generally vertical movement relative thereto about a dump pivot axis located rearwardly of said axis of rotation, said frame being pivotable about a tilt pivot axis located between said articulation axis and said dump pivot axis;

a first connection device interconnecting said load bed and said frame to control the pivotal movement of said load bed relative to said frame, a disengagement of said first connection device permitting staid load bed to pivot about said dump pivot axis; and a second connection device interconnecting said frame and said tongue to control the articulation of said frame relative to said tongue, a disengagement of said second connection device with the engagement of said first connection device permitting said load bed to pivot with said frame about said tilt pivot axis while said tongue articulates relative to said frame about said articulation axis.

35. The trailer of claim 34 wherein said tilt pivot axis coincides with said axis of rotation, said actuator mechanism being supported on said tongue and coupled to said load bed to power the pivotal movement of said load bed about at least one of said dump pivot axis and said axis of rotation.

36. The trailer of claim 35 wherein said actuator mechanism comprises:
   a mounting bracket affixed to said tongue;
   a linear actuator supported on said mounting bracket; and
   a yoke connected to said linear actuator to effect vertical movement thereof in response to a corresponding movement of said linear actuator, said yoke being pivotally connected to said load bed to cause vertical movement thereof.

37. An actuating mechanism for use between a frame and a movable member pivotally connected to said frame to effect pivotal movement of said movable member relative to said frame, comprising:
   a linear actuator supported on said frame and including a housing defining a first end of said linear actuator and an extensible member defining a second end of said linear actuator, said extensible member being linearly movable from an operative portion of said housing spaced from said first end; and
   a yoke connected to said linear actuator at a connection point and having arms pivotally connected to said movable member along a yoke pivot axis to effect vertical movement of said movable member relative to said frame in response to a corresponding linear movement of said extensible member, said yoke pivot axis being located such that said operative portion is located between said connection point and said yoke pivot axis when said linear actuator is fully retracted with said first and second ends spaced at a minimum distance.

38. The actuating mechanism of claim 37 wherein one of said first and second ends is pivotally connected to said frame to define an actuator pivot, said yoke pivot axis being aligned with actuator pivot when said linear actuator is in a completely collapsed condition with said first end at a minimum distance from said second end to permit said linear actuator and said yoke to be pivotable about said actuator pivot and said yoke pivot axis to move between an upright operative position to a lowered inoperative position.

39. The actuating mechanism of claim 38 further comprising a latch mechanism for controlling the pivotal movement of said linear actuator and said yoke between said upright operative position and said lowered inoperative position.

40. The actuating mechanism of claim 39 wherein said movable member corresponds to a load bed of a trailer and said frame corresponds to a draft tongue of said trailer, said linear actuator and said yoke being positionable below said load bed when placed into said lowered inoperative position.

41. The actuating mechanism of claim 40 wherein said yoke is affixed to said housing, said arms extending past said operative portion to align with a remote end of said extensible member.

42. The actuating mechanism of claim 40 wherein said yoke is affixed to said extensible member.

\* \* \* \* \*